(12) United States Patent
Ohta et al.

(10) Patent No.: US 6,219,489 B1
(45) Date of Patent: Apr. 17, 2001

(54) APPARATUS AND METHOD FOR DISCRIMINATING RECORDING MODE

(75) Inventors: Kiyoshi Ohta, Kanagawa; Atsushi Suzuki, Tokyo; Kazunori Takagi, Saitama, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/964,741

(22) Filed: Nov. 5, 1997

(30) Foreign Application Priority Data

Nov. 7, 1996 (JP) .................................... 8-309906

(51) Int. Cl.$^7$ .................................................. H04N 5/225
(52) U.S. Cl. ............................... 386/117; 386/79; 386/68; 360/77.14; 348/333; 358/906
(58) Field of Search .................................. 386/1, 6–8, 16, 386/38, 35, 68, 81–82, 46, 79–80; 358/906, 909.1; 348/333; 360/77.14, 77.15; H04N 5/225

(56) References Cited

U.S. PATENT DOCUMENTS

| | | | |
|---|---|---|---|
| 4,568,986 | * | 2/1986 | Furuhata et al. ..................... 386/81 |
| 4,607,298 | | 8/1986 | Yamashita . |
| 4,663,673 | | 5/1987 | Doutsubo . |
| 4,682,247 | | 7/1987 | Doutsubo . |
| 4,811,129 | | 3/1989 | Kubo . |
| 4,814,900 | * | 3/1989 | Nemoto et al. ..................... 386/79 |
| 4,864,430 | * | 9/1989 | Yoshimura et al. ................... 386/74 |
| 5,010,424 | * | 4/1991 | Hasegawa et al. ................ 360/77.14 |
| 5,592,224 | * | 1/1997 | Shim ................................... 348/333 |
| 5,638,484 | * | 6/1997 | Yun ...................................... 386/79 |
| 5,801,774 | * | 9/1998 | Seo ..................................... 348/333 |
| 6,026,211 | * | 2/2000 | Nakamura et al. .................... 386/46 |

FOREIGN PATENT DOCUMENTS 369 481   5/1990  (EP) .

* cited by examiner

*Primary Examiner*—Thai Tran
*Assistant Examiner*—Vincent F. Boccio
(74) *Attorney, Agent, or Firm*—Frommer Lawrence & Haug, LLP.; William S. Frommer; Bruno Polito

(57) ABSTRACT

In order to easily discriminate a recording mode of a magnetic tape even when the fast feeding/rewinding reproducing operation is set to the odd number times speed or even number times speed, a standard pilot signal for generating the tracking error signal is set to a fixed frequency when the fast feeding/rewinding reproducing operation is performed in the even number times speed of the ordinary reproduction speed and the standard pilot signal is set in the rotational frequencies when the fast feeding/rewinding reproducing operation is performed in the odd number times speed. Thus, the recording mode is discriminated by making reference to the time series pattern of an output obtained by sampling the tracking error signal obtained on the basis of the reproduced pilot signal and the standard pilot signal in the predetermined timing.

4 Claims, 25 Drawing Sheets

| LIQUID CRYSTAL DISPLAY MODE | OPERATION MODE | | REFERENCE PILOT SIGNAL |
|---|---|---|---|
| | FAST FEEDING REPRODUCTION | REWIDING REPRODUCTION | |
| ON | +6 TIMES SPEED | −6 TIMES SPEED | FIXED |
| OFF | +9 TIMES SPEED | −7 TIMES SPEED | ROTATIONAL |

FIG. I
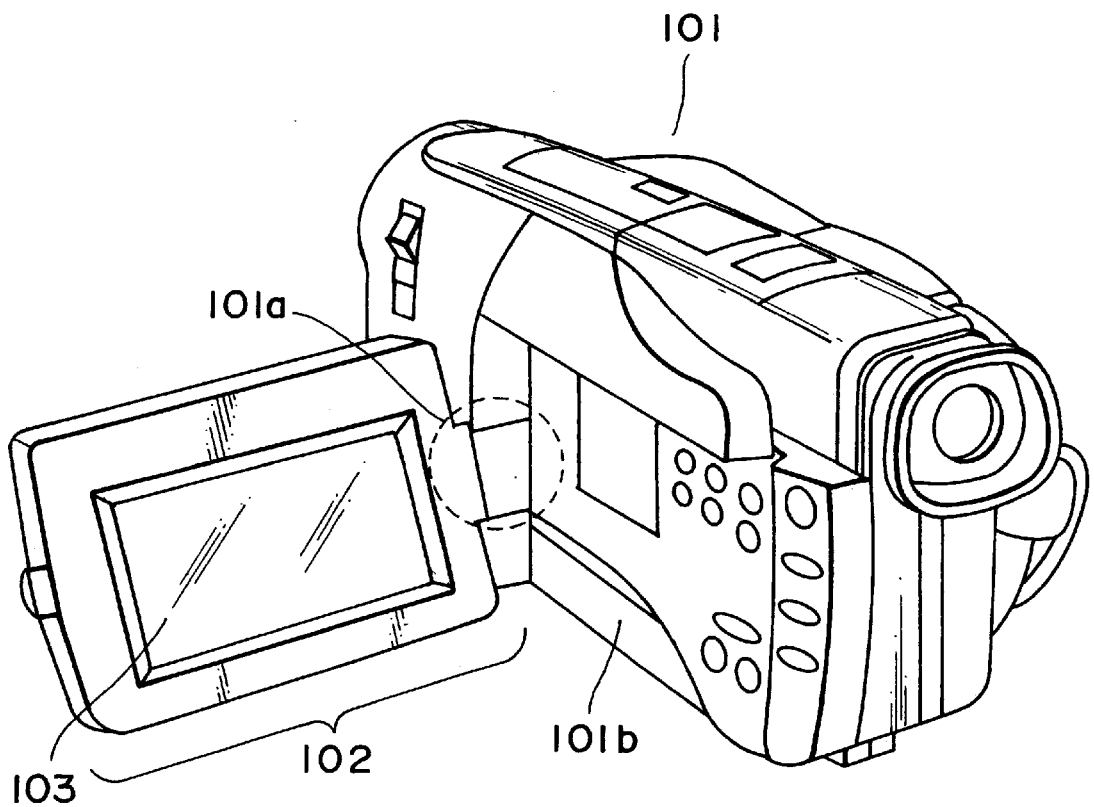

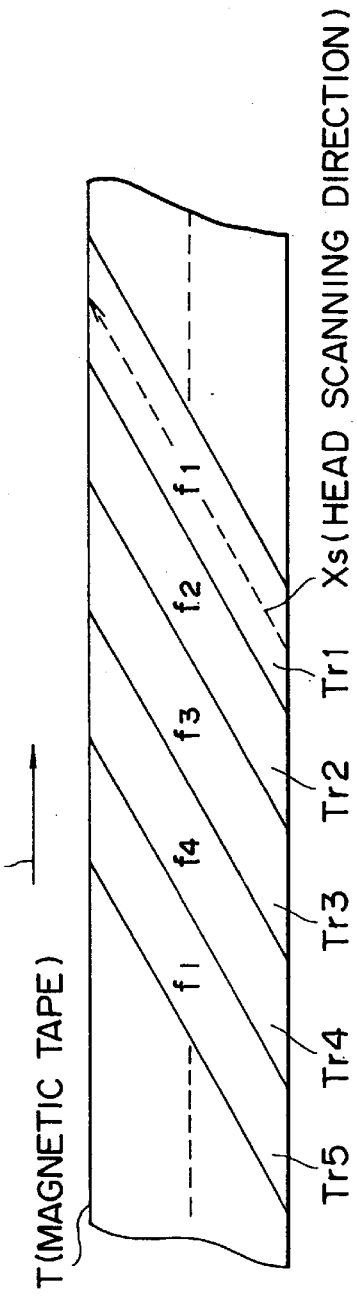
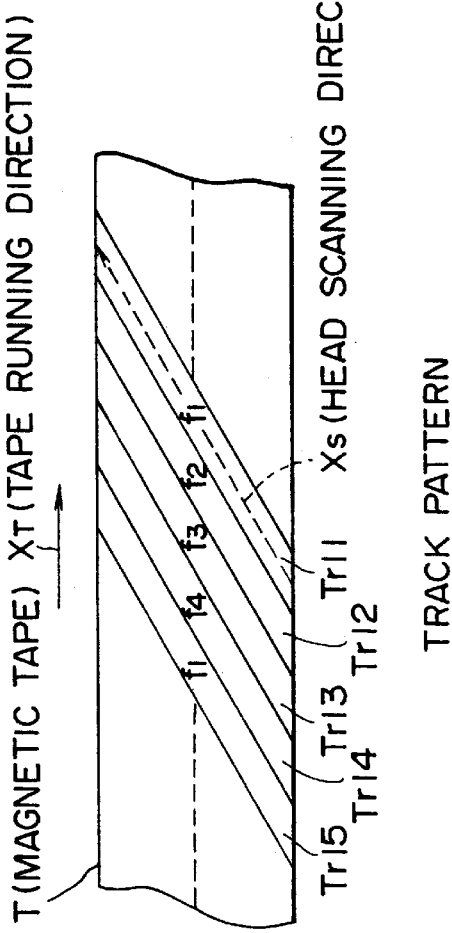
FIG. 2A  SP MODE
FIG. 2B  LP MODE

F I G. 5

| LIQUID CRYSTAL DISPLAY MODE | OPERATION MODE | | REFERENCE PILOT SIGNAL |
| --- | --- | --- | --- |
| | FAST FEEDING REPRODUCTION | REWIDING REPRODUCTION | |
| ON | +6 TIMES SPEED | −6 TIMES SPEED | FIXED |
| OFF | +9 TIMES SPEED | −7 TIMES SPEED | ROTATIONAL |

FIG. 7

| SP MATCHING<br>LP MATCHING | +6 TIMES SPEED/<br>-6 TIMES SPEED | +9 TIMES SPEED/<br>-9 TIMES SPEED |
|---|---|---|
| | HHHHHHHHHHHH | HHHHHHHHHHHH |
| SP→LP | HLHLHLHLHLHL | HXLXHXLXHXLX |
| LP→SP | HXLXHXLXHXLX | HHXXLLXXHHXXLL |

FAST FEEDING REPRODUCTION : [LP→SP]
(+6 TIMES SPEED)

REWINDING REPRODUCTION (-6 TIMES SPEED)

REWINDING REPRODUCTION : [LP→SP]
(−6 TIMES SPEED)

FIG. 20 FAST FEEDING REPRODUCTION (+9 TIMES SPEED)

REWINDING REPRODUCTION (+9 TIMES SPEED):[SP→LP]

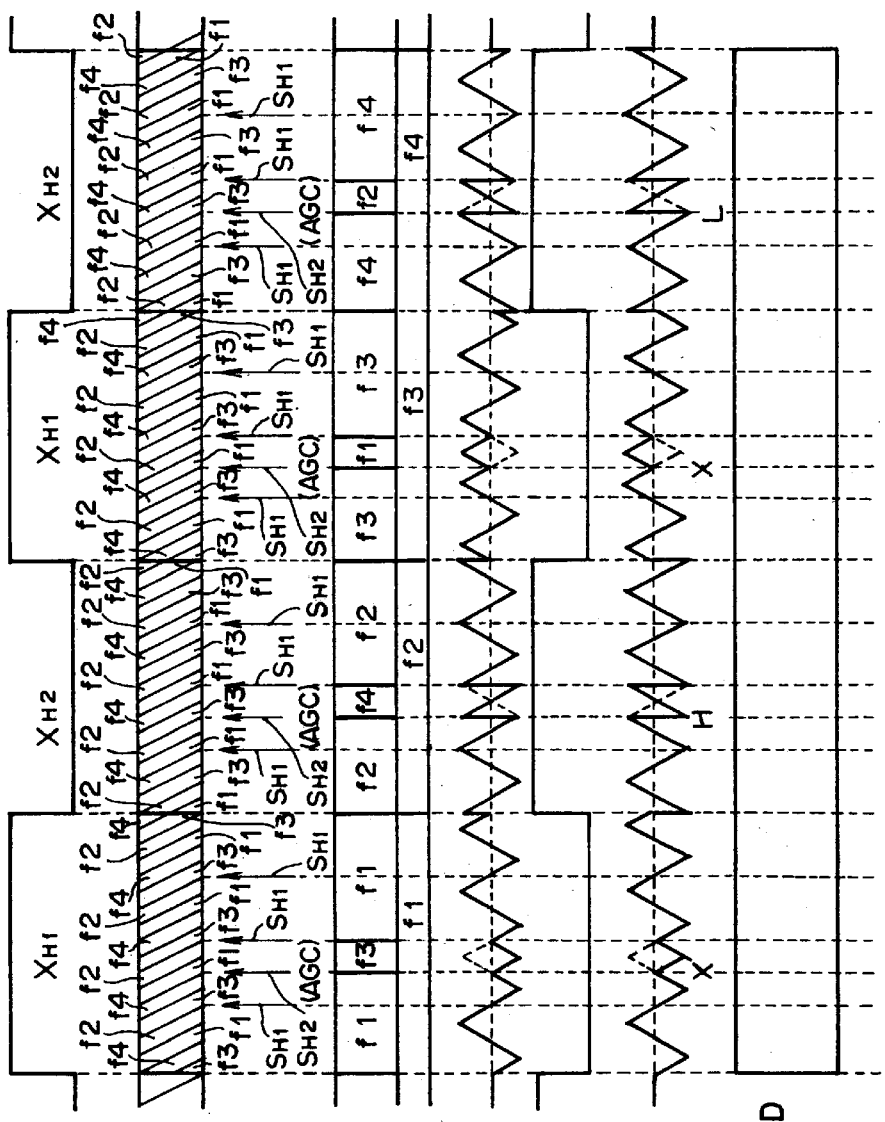

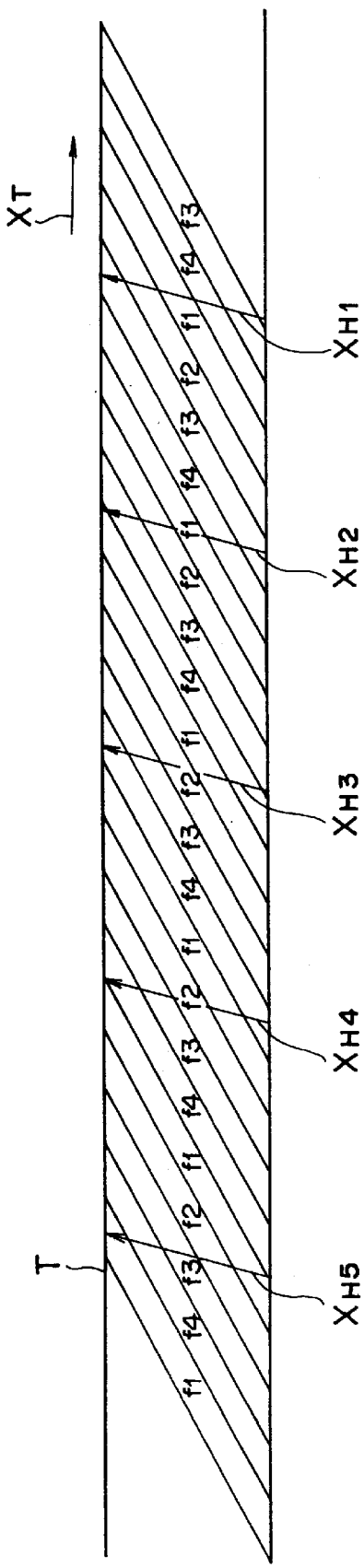

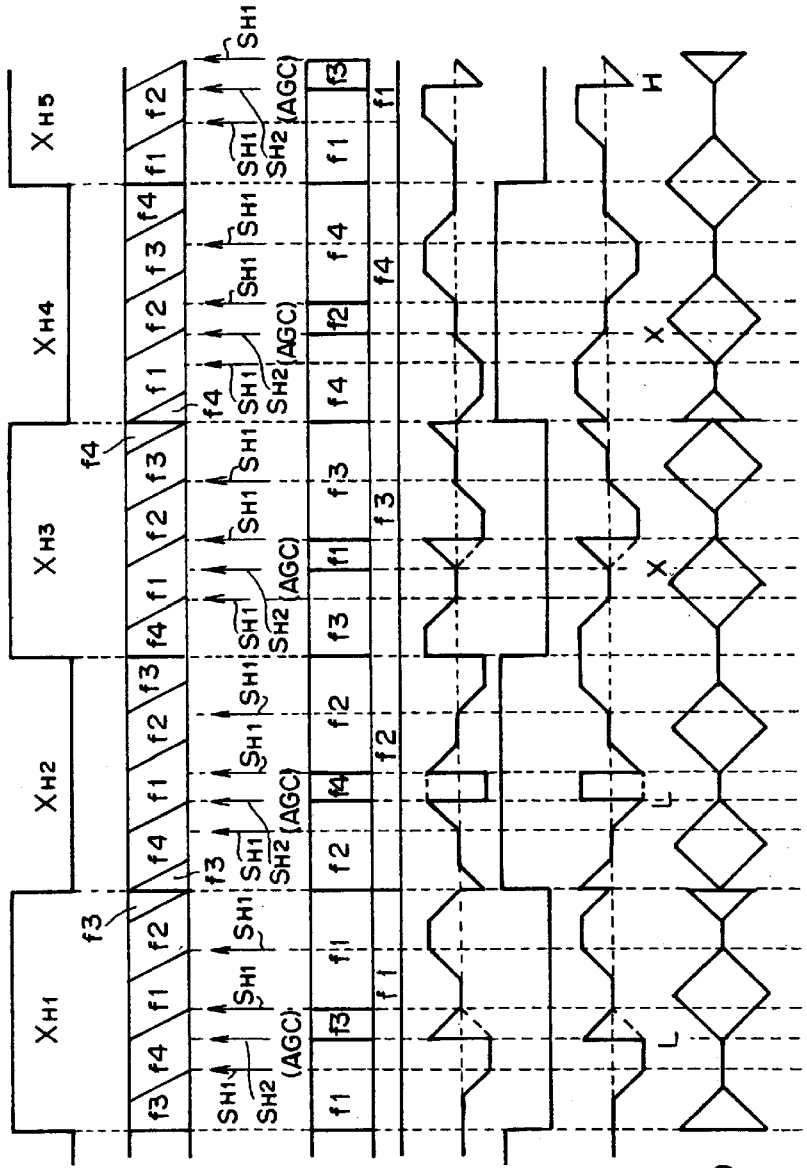

APPARATUS AND METHOD FOR DISCRIMINATING RECORDING MODE

BACKGROUND OF THE OPERATION

1. Field of the Invention

The present invention relates to a recording mode discriminating apparatus for discriminating the recording mode of a recording medium such as a recording tape in the fast feeding or rewinding reproduction mode corresponding to a tape type recording medium recording/reproducing apparatus such as a VTR (Video Tape Recorder) which performs tracking control, for example, by the ATF (Automatic Track Finding)system and more particularly to a recording mode discriminating apparatus to be provided in a VTR comprising a liquid crystal display apparatus as a monitor apparatus.

2. Description of the Related Art

As a VTR, for example, particularly in so-called a portable type camcorder, etc., those providing a liquid crystal display apparatus for monitoring a reproduced image or a pickup image are widely spreading.

A VTR comprising a liquid crystal display apparatus as explained above is assumed to introduce a system for recording to the tracks on the guardbandless basis through the helical scanning with a pair of heads in different azimuth angles, for example, which are provided in the opposition angle of 180° for a rotating drum. It is known that when an image of fast feeding or rewinding reproduction is attempted to be displayed in direct on such a liquid crystal display apparatus, noise bars are appearing in the horizontal direction in the fast feeding/rewinding reproduction image corresponding to the period where the reproduced RF signal becomes insufficient because the head is crossing a plurality of tracks.

Therefore, as disclosed, for example, in the Japanese Patent Application Laid-Open No. HEI 2-137586, the inventors of the present invention have proposed previously a structure whereby noise bars explained above are not appearing in the image of the liquid crystal display apparatus during the fast feeding/rewinding reproduction mode.

In this invention, a liquid crystal display apparatus which is driven by the matrix system is assumed to be provided. In the fast feeding/rewinding reproduction mode, a magnetic tape is caused to run at the speed equal to the predetermined even number times the speed of the ordinary reproducing mode. When the tape is run at the even number times speed, it is known that the period in which the reproduced RF signal becomes insufficient, namely the position where noise bar appears as a reproduced image differs in the horizontal direction in each field.

Therefore, during the ordinary fast feeding/rewinding reproduction mode at the speed equal to the even number times the ordinary tape running speed, the fast feeding/rewinding reproduction mode image in which the noise bars are eliminated can be displayed by stopping the supply of a horizontal scanning signal to drive the liquid crystal display apparatus in the period corresponding to the part where the reproduced RF signal is insufficient, namely the reproduced image can be considered unnecessary in order to display the image portion of the just preceding field (an image of this part is displayed based on the reproduced RF signal of the sufficient level) by making use of the holding effect of the liquid crystal display apparatus.

In a 8 mm VTR, for example, as the VTR having introduced the ATF tracking control system without using the control track, the so-called "4-frequency ATF system" utilizing four kinds of pilot signals of predetermined different frequencies has been employed. In this 4-frequency ATF system, such four kinds of pilot signals are sequentially recorded in the track by the rotational manner. During the reproduction mode, the tracking control is performed so that the reproducing head adequately traces the target track depending on the tracking error signal which is generated on the basis of the reference pilot signals (in the same frequencies as the four kinds of pilot signals explained above) which is sequentially rotated corresponding to the pilot signal (reproduced pilot signal) obtained from the reproduced RF signal and the scanning timing of head (for example, field timing).

Moreover, a known 8 mm VTR which has employed the 4-frequency ATF system as explained above is provided, as the recording mode, with the standard mode (SP ode) which realizes recording to the track by causing a magnetic tape to run at the standard speed and a long playing mode (LP mode) which realizes, as a result, the recording time corresponding to almost two times that in the SP mode for the magnetic tape of the same length by executing the recording to the track, for example, in the tape running speed of a half time (½ time) the standard speed as explained above.

Therefore, it is naturally thought that the region where recording has been performed in the SP mode and the region where recording has been performed in the LP mode exist, for example, in the mixed manner on the same magnetic tape. For example, when the region on the magnetic tape changes to the region recorded by the LP mode from the region recorded by the SP mode depending on the running of the tape even in the fast feeding/rewinding reproduction mode as the special reproduction mode as well as in the ordinary reproduction mode, the reproducing operation condition corresponding to the SP mode must be changed to the condition corresponding to the LP mode in order to adequately display the fast feeding/rewinding reproduction mode image of the region recorded by the LP mode. In the same manner, when the region on the magnetic tape changes to the region recorded by the SP mode from the region recorded by the LP mode during the fast feeding/rewinding reproduction mode, the reproducing operation condition corresponding to the LP mode must be changed to the condition corresponding to the SP mode.

In order to realize the switching of the tape running speed in the fast feeding/rewinding reproduction mode depending on the recording mode as explained previously, it is essential in the fast feeding/rewinding reproduction mode to discriminate by which mode of the SP mode and LP mode the track of the magnetic tape during the reproduction mode is recorded and a structure for discriminating such recording mode has been proposed in the Japanese Patent Application LaidOpen No. SHO 62-184646 by the inventors of the present invention.

In this invention, the tape running speed during the fast feeding/rewinding reproduction mode is set to the predetermined odd number times the ordinary reproduction speed and then the tracking error signal obtained as explained above is sampled with the predetermined timing. In this case, a sampling output has an intrinsic time series pattern which is different for each relationship between the recording mode of the magnetic tape and tape running speed and therefore the recording mode of the magnetic tape can be discriminated by making reference to the time series pattern of the sampling output.

With the background described above, for example, in a 8 mm VTR (camcorder) comprising a current liquid crystal display apparatus, noise bars do not appear in the liquid crystal display screen by setting the tape running speed in the fast feeding/rewinding reproduction mode to odd number times the ordinary reproduction speed under the condition that the liquid crystal display mode is set to OFF state and display of the reproduced image by the liquid crystal display apparatus is not required or by setting the tape running speed to even number times the ordinary reproduction speed under the condition that the liquid crystal display mode is set to ON state.

However, when the recording mode discrimination of the magnetic tape is attempted during the fast feeding/rewinding reproduction in the 8 mm VTR introducing the structure explained above, since the tape running speed is set to the odd number times the ordinary reproduction speed under the condition that the liquid crystal display mode is in the OFF state, the recording mode can be discriminated without any problem by monitoring, conforming to the structure disclosed in the Japanese Patent Application Laid-Open No SHO 62-184646 described previously, a time series change of sample output of the tracking error signal which is obtained depending on the reproduced pilot signal and the reference pilot signal which is rotated in the field timing.

On the other hand, it is known that, under the condition that the liquid crystal display mode is in the ON state, the tape running speed in the fast feeding/rewinding reproduction mode is set to the even number times the ordinary reproduction speed, but under the condition of the even number times speed, intrinsic time series pattern of the sample output of the tracking error signal does not appear in the SP mode and LP mode. Namely, there is a problem under this condition that discrimination of the SP/LP mode by the recording mode discrimination method explained above is very difficult.

SUMMARY OF THE INVENTION

The present invention has been proposed considering the problems explained previously and it is therefore an object of the present invention to provide a recording mode discriminating apparatus and a recording mode discriminating method in which the recording mode of magnetic tape can be discriminated easily corresponding to any condition of the even number times speed and odd number times speed in a VTR which enables switching of the tape running speed in the fast feeding/rewinding reproduction mode between the speed equal to the even number times the ordinary reproduction speed (when the liquid crystal display mode is ON) and the speed equal to the odd number times (when the liquid crystal display mode is OFF) by providing, for example, the liquid crystal display apparatus.

Therefore, the present invention proposes a recording mode discriminating apparatus for discriminating the recording mode of the recording medium such as a recording tape which is driven in different running speeds corresponding to a plurality of recording modes for recording to the track with the predetermined head to rotationally record a plurality of pilot signals indifferent frequencies for the tracking control during the reproduction, which is provided with a discriminating means for outputting, when the high speed reproducing operation mode by the even number times speed of the speed in the ordinary reproduction mode is selected as the operation mode for running the recording tape medium, a fixed reference pilot signal of the predetermined kind among a plurality kinds of reference pilot signals including the frequency signal matched with the pilot signal used for generation of the tracking error signal and discriminating the recording mode based on the time series change pattern of the output signal obtained by sampling the tracking error signal obtained on the basis of the fixed reference pilot signal in the predetermined timing and rotationally outputting, when the high speed reproducing operation mode by the odd number times speed of the speed in the ordinary reproduction mode is selected, a plurality kinds of the reference pilot signals in the predetermined timing and discriminating the recording mode on the basis of the time series change pattern of the output signal obtained by sampling the tracking error signal obtained based on a plurality of pilot signals rotationally output.

Moreover, in a recording mode discriminating apparatus for discriminating the recording mode of the recording medium such as a recording tape which is driven in different running speeds corresponding to a plurality of recording modes for recording to the track with the predetermined head to rotationally record a plurality of pilot signals in different frequencies for the tracking control during the reproduction, when the high speed reproducing operation mode by the even number times speed of the speed in the ordinary reproduction mode is selected as the operation mode for running the tape recording medium, the recording mode of the running tape recording medium is discriminated on the basis of the time series change pattern of the output signal obtained by outputting a fixed reference pilot signal of the predetermined kind among a plurality of the reference pilot signals including the frequency signal matched with the pilot signal used for generation of the tracking error signal and then sampling in the predetermined timing the tracking error signal obtained on the basis of the reference pilot signal of the fixed output and when the high speed reproducing operation mode by the odd number times speed of the speed in the ordinary reproduction mode is selected, the recording mode is discriminated on the basis of the time series change pattern of the output signal obtained by rotationally outputting a plurality kinds of the reference pilot signals in the predetermined timing and then sampling in the predetermined timing the tracking error signal obtained on the basis of a plurality kinds of the reference pilot signals rotationally output.

According to the structure explained above, when the tape running speed in the fast feeding/rewinding reproduction mode is set to the even number times the speed of the ordinary reproducing operation, the reference pilot signal used for generation of the tracking error signal is not rotated and only a fixed kind of pilot signal is output. Thereby, the time series pattern which is different for each relationship between the recording mode of magnetic tape and tape running speed can be obtained from the output obtained by sampling the tracking error signal in the predetermined timing.

BRIEF DESCRIPTION OF THE DRAWINGS

Other objects and advantages of the present invention will be apparent from the following detailed description of the presently preferred embodiments thereof, which description should be considered in conjunction with the accompanying drawings.

FIG. 1 is a perspective view showing the outline of a VTR to which the preferred embodiment of the present invention is applied.

FIGS. 2A and 2B are diagrams for explaining a track pattern of the SP mode and LP mode.

FIG. 5 is a diagram showing a list of difference in the setting of the tape running speed in the fast feeding/rewinding reproduction mode corresponding to the liquid crystal display mode and the setting of the reference pilot signal.

FIG. 7 is a diagram showing a list of the time series pattern of the recording mode discriminating signal in each condition to be used for the recording mode discrimination.

FIGS. 23A to 23I show a timing chart indicating operations of the essential portions obtained on the basis of the tracing condition of FIG. 22.

FIG. 24 is a diagram showing the tracing condition of a head for the track recorded on a magnetic tape.

FIGS. 25A to 25I show a timing chart indicating operations of the essential portions obtained on the basis of the tracing condition of FIG. 24.

DESCRIPTION OF THE PREFERRED EMBODIMENT

Figure 3:
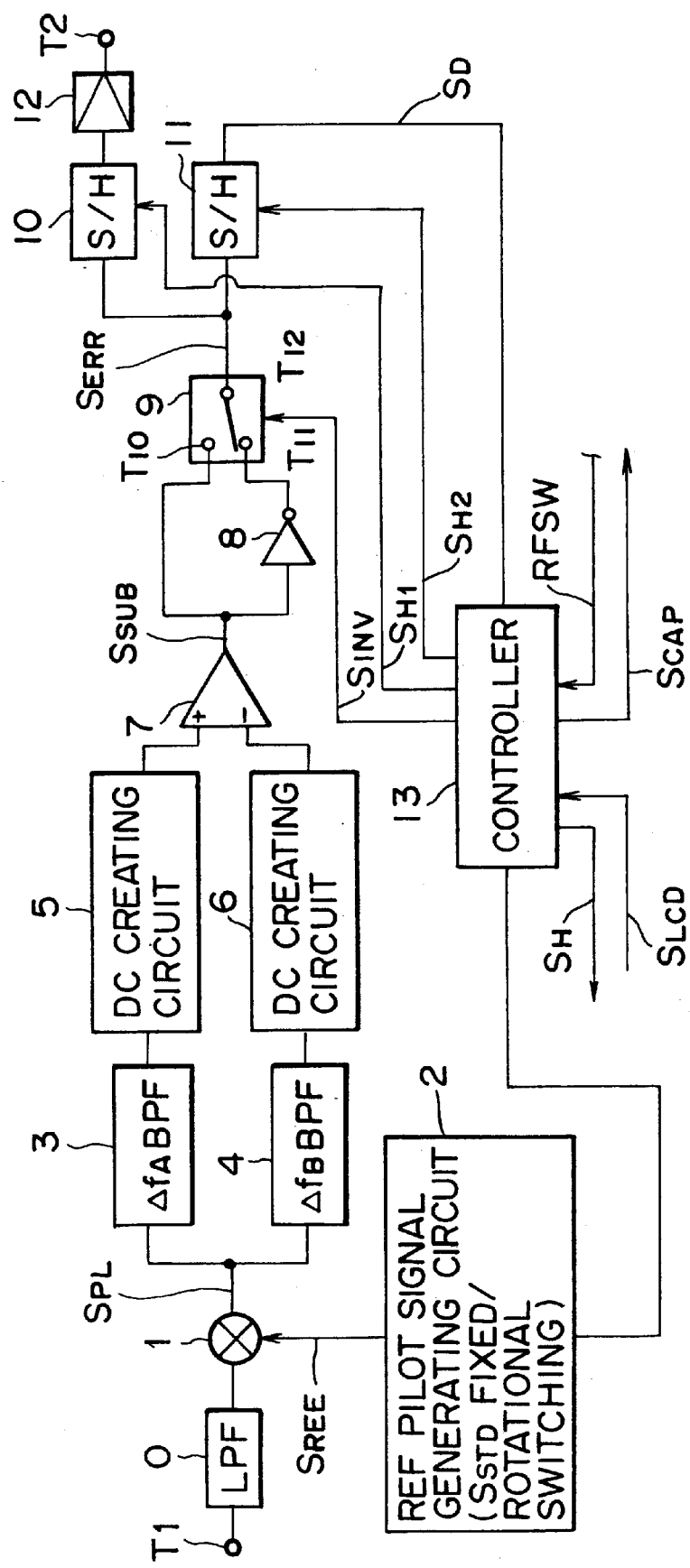
FIG. 3 is a block diagram showing a structure of the recording mode discriminating apparatus as the preferred embodiment of the present invention.

A preferred embodiment of the present invention will be explained in detail. The recording mode discriminating apparatus as the preferred embodiment of the present invention is assumed to be provided in a 8 mm VTR comprising a liquid crystal display apparatus.

Explanation will be made in the following sequence of contents.
<1. Outline of a VTR>
<2. Track pattern of SP mode and LP mode>
<3. Structure of the recording mode discriminating circuit>
<4. Structure of liquid crystal display>
<5. Recording mode discrimination process of the embodiment>
<6. Time series pattern of recording mode discrimination signal>
 (a. When liquid crystal display mode is ON)
 (b. When liquid crystal display mode is OFF)

FIG. 1 is a perspective view showing the outline of an 8 mm VTR provided with a recording mode discriminating apparatus as the preferred embodiment of the present invention. As shown in this figure, a VTR 100 of the embodiment employs the structure of a so-called portable camcorder which enables recording of pickup image by providing a video camera.

The VTR body 101 comprising a video camera is also provided with a liquid crystal monitor 102 in such a manner as coupling through a movable mechanical portion 101a as shown in the figure. This liquid crystal monitor 102 is also provided with a liquid crystal display 103 as the display screen of the liquid crystal display apparatus. This liquid crystal display 103 is capable of displaying the current pickup image or reproduced image (normal reproduced image and specially reproduced image) of a 8 mm cassette tape loaded in the VTR.

The liquid crystal monitor 102 can freely change its direction within the specified range by means of the movable mechanical portion 101a. For example, a user can determine the direction by moving freely the liquid crystal monitor 102 depending on the current operating condition.

This figure shows the liquid crystal monitor 102 which is opened in separation from the liquid crystal accommodating means 101b in one side of the VTR body 101. When the liquid crystal monitor 102 is isolated from the liquid crystal accommodating means 101b, the opening condition of the liquid crystal monitor 102 can be detected, for example, by a switch not illustrated to turn ON the liquid crystal display mode. Thereby, the power supply for display operation is supplied toward the liquid crystal monitor 102 causing, for example, the liquid crystal display 103 to display a pickup image when the video camera is used for picking up the image or to display the reproduced image when a video tape is being reproduced.

Moreover, when the liquid crystal monitor 102 is closed, for example, by accommodating it into the liquid crystal accommodating means 101b to one side of the VTR body 101 from the condition shown in FIG. 1, the switch explained above detect s the closing condition of the liquid crystal monitor 102, turning OFF the liquid crystal display mode. In this case, supply of power to the liquid crystal monitor 102 is stopped, disabling monitor display in the liquid crystal display 103.

<2. Track pattern of SP mode a n d LP mode>

The VTR 100 of this embodiment is provided, as the recording mode, with the SP mode in which recording to the track is performed in the standard tape running speed and the long time recording mode called the LP mode in which the recording time of the same length is set to two times the recording time in the SP mode by executing the recording to track in the tape running speed of ½ times the speed in the SP mode. When a user freely selects any one recording mode in the recording operation mode, the tape running speed corresponding to the selected recording mode is set for the recording. Moreover, in the VTR 100 of the embodiment, a head for SP mode in which a gap length of head is adjusted for the recording/reproducing operation of the SP mode and a head for LP mode in which a gap length of head is adjusted narrower than that of SP mode for the recording/reproducing operation of the LP mode are provided independently.

As the SP mode head, a couple of heads in different azimuth angles are provided opposed with each other in both sides of the rotating drum keeping the separation angle of 180°. In the same manner, as the LP mode head, a couple of heads in different azimuth angles are also provided opposed with each other in both sides of the rotating drum keeping the separation angle of 180° and also keeping the distance to the SP mode heads of the predetermined angle.

FIGS. 2A and 2B are schematically showing track patterns respectively recorded in the SP mode and LP mode.

FIG. 2A shows the track pattern in the SP mode, in which the magnetic tape is driven to run in the normal speed corresponding to the SP mode for the tape running direction $X_T$ shown in the figure.

The tracks Tr1 to Tr5 are sequentially recorded in the diagonal direction by tracing the running magnetic tape T along the head scanning direction $X_s$ indicated by a broken line of the figure with a couple of the SP mode heads. In this embodiment, one track corresponds to one field period.

Since this embodiment is introducing the 4-frequency AFT system, recording is performed in such a manner as sequentially rotating the four kinds of pilot signals in different frequencies $f_1$, $f_2$, $f_3$, $f_4$ in unit of track. FIG. 2A indicates that the pilot signals are recorded in the sequence of $f_1 \rightarrow f_2 \rightarrow f_3 \rightarrow f_4 \rightarrow f_1$ for the tracks Tr1 to Tr5. These pilot signals $f_1$, $f_2$, $f_3$, $f_4$ are recorded in the superimposed condition like the frequency multiplexing for the image signal in the case of the recording format of the 8 mm VTR.

In FIG. 2B, the track pattern by the LP mode is compared with the track pattern by the SP mode in FIG. 2A. The same portions as those in FIG. 2A are designated by the same code.

In this case, the magnetic tape T is assumed to be running in the normal speed (0.5 times the speed of SP mode) corresponding to the LP mode for the tape running direction $X_T$ and the tracks Tr11 to Tr15 are sequentially recorded as shown in the figure by scanning the magnetic tape T in the field timing along the head scanning direction $X_s$ with the LP mode head. In this case, the track pitch of the tracks Tr11 to Tr15 is almost ½ of the tracks Tr1 to Tr5 formed in the SP mode.

Even in the LP mode, recording is performed as in the case of the SP mode in such a manner as sequentially rotating the pilot signals $f_1$, $f_2$, $f_3$, $f_4$ in unit of the track. FIG. 2B also shows that the pilot signals are recorded in the sequence of $f_1 \rightarrow f_2 \rightarrow f_3 \rightarrow f_4 \rightarrow f_1$ for the tracks Tr11 to Tr15.

When the magnetic tape recorded as explained above is reproduced in the normal reproduction mode, if the magnetic tape is recorded in the SP mode, the control is performed so that the tape is once caused to run in the normal running speed corresponding to the SP mode and then the SP mode head adequately traces the track to obtain the reproduced output (reproduced RF signal). Moreover, when the magnetic tape is recorded in the LP mode, the control is performed so that the tape is once caused to run in the normal running speed corresponding to the LP mode and the LP mode head traces adequately the track shown in FIG. 2B to obtain the reproduced RF signal.

In addition, in the fast feeding/rewinding reproduction mode, the magnetic tape is caused to run in the predetermined multiplied speed as will be explained for the normal tape running speed and the rotating head traces the tape as crossing the tracks.

<3. Structure of recording mode discriminating circuit>

FIG. 3 is a block diagram showing an example of the structure of the recording mode discriminating circuit provided within the VTR 100 shown in FIG. 1. The recording mode discriminating circuit shown in this figure introduces a circuit structure used in common with the structure of the tracking error signal generating circuit for generating the tracking error signal used for tracking control. As the tracking control system, so-called "4-frequency ATF system" explained previously is introduced and therefore the circuit diagram shown in FIG. 2 is structured corresponding to this 4-frequency ATF system. A part of the RF signal reproduced by the reproduction head from the magnetic tape recorded as shown in FIG. 2 is supplied as an input signal to an input terminal T1. This input signal is subjected to extraction of the pilot signal element through a low-pass filter LPFO and is then supplied to a multiplier 1 as the reproduced pilot signal $S_{PL}$.

The REF pilot signal generating circuit 2 generates the reference REF pilot signal $S_{REF}$ and outputs it to the multiplier 1. As the REF pilot signal $S_{REF}$ generated by this REF pilot signal generating circuit 2, the signals $f_1$, $f_2$, $f_3$, $f_4$ of the same frequency as the four kinds of pilot signals explained previously can be generated and only one signal of these signals $f_1$, $f_2$, $f_3$, $f_4$ is output selectively. In this embodiment, each frequency of the pilot signals $f_1$, $f_2$, $f_3$, $f_4$ is specified as follow.

$f_1$=102 kHz $f_2$=116 kHz $f_3$=160 kHz $f_4$=146 kHz

The REF pilot signal generating circuit 2 rotationally outputs, in general, the signals $f_1$, $f_2$, $f_3$, $f_4$ as the REF pilot signal $S_{REF}$ depending on the timing (trace timing of head) of every one field. Namely, the signal of the same frequency as the center frequency of the reproduced pilot signal is output as the carrier frequency for balanced modulation.

Meanwhile, as explained later, in the fast feeding/rewinding reproduction mode by the even number times speed corresponding to the mode where the liquid crystal display mode is turned ON, the control is made so that the REF pilot signal $S_{REF}$ is not rotationally output but is provided as the fixed output. However, in the REF pilot signal generating circuit 2, the standard pilot signal $S_{STD}$ by the signals $f_1$, $f_2$, $f_3$, $f_4$ is actually generated and it is set that this signal should be provided as the fixed output or rotational output. The REF pilot signal $S_{REF}$ which is actually output to the multiplier 1 from the REF pilot signal generating circuit 2 is output in such a manner that it is temporarily switched to the inverted signal (for example, the inverted signal becomes $f_3$ when the standard pilot signal $S_{STD}$ is $f_1$) of the predetermined different kinds of frequencies in the predetermined period within the one field timing in regard to the standard pilot signal $S_{STD}$ as explained above. As a result, the tracking error signal is inverted only in the period of the inverted signal explained above and thereby the artificial lock phenomenon, for example, for the adjacent track can be prevented.

The signal output from the multiplier 1 is input in the branching manner to a $\Delta f_A$ band-pass filter 3 and a $\Delta f_B$ band-pass filter 4.

In the $\Delta f_A$ band-pass filter 3, a difference frequency element signal $\Delta f_A$ expressed by the formula $$\Delta f_A = |f_1 - f_2| = |f_3 - f_4| = 14 \text{ kHz}$$

can be extracted.

Moreover, in the $\Delta f_B$ band-pass filter 4, a difference frequency element signal $\Delta f_B$ expressed by the formula $$\Delta f_B = |f_2 - f_3| = |f_4 - f| = 44 \text{ kHz}$$

can be extracted.

The difference frequency element signal $\Delta f_A$ obtained by the $\Delta f_A$ band-pass filter 3 is input to a DC creating circuit 5 and thereby the signal level is converted to a DC and it is then output to the inverted input of a subtractor 7. In the same manner, the difference frequency element signal $\Delta f_B$ obtained by the $\Delta f_B$ band-pass filter 4 is supplied to the DC creating circuit 5 and thereby the signal level is converted to a DC and it is then output to the non-inverted input of the subtractor 7.

Here, the difference frequency element signals $\Delta f_A$, $\Delta f_B$ are generated by crosstalk element for each track adjacent to both sides of the track to be traced by the head in the reproduction mode. Therefore, when the head is realizing the best tracking, levels of the difference frequency element signals $\Delta f_A$, $\Delta f_B$ become equal and when tracking is deviated to any one track, each signal level of the difference frequency element signals $\Delta f_A$, $\Delta f_B$ is relatively changed depending on the direction and amount of deviation of the tracking.

The subtractor 7 supplies a subtraction output of the difference frequency element signals $\Delta f_A$, $\Delta f_B$ depending on the tracking condition of the head as an arithmetic output signal $S_{SUB}$. This arithmetic output signal $S_{SUB}$ is supplied to a terminal $T_{10}$ of the switch circuit 9 and is also branched and supplied to a terminal $T_{11}$ of the switch circuit 9 after passing through an inverter 8.

The switch circuit 9 is controlled so that the terminal $T_{12}$ is selectively switched to the terminal $T_{10}$ or the terminal $T_{11}$ depending on the level of the inverted control signal $S_{INV}$ output from the controller 13. The inverted control signal $S_{INV}$ is inverted to H and L levels for each field as will be explained.

In this embodiment, an output signal of the terminal $T_{12}$ of the switch circuit 9 is assumed as the tracking error signal $S_{ERR}$. This tracking error signal $S_{ERR}$ is branched and then supplied respectively to the sample hold circuits 10, 11.

The sample hold circuit 10 samples the input tracking error signal $S_{ERR}$ with the sample hold control signal $S_{H1}$ output in the predetermined timing from the controller 13 and supplies this sample hold output to the terminal T2 via an amplifier 12. The sample hold output obtained via the terminal T2 is supplied to the tracking servo circuit system not illustrated for use in the actual tracking control.

Moreover, the tracking error signal $S_{EER}$ supplied to the hold circuit 11 is sampled depending on the timing of the sample hold control signal $S_{H1}$ output from the controller 13. This sample hold output is supplied to the controller 13 as the recording mode discriminating signal $S_D$. The controller 13 discriminates whether the recording mode of the magnetic tape is SP mode or LP mode as will be explained later by monitoring the pattern (time series pattern) of level change on the time axis of the recording mode discriminating signal $S_D$.

The controller 13 is provided for controlling various kinds of operations of the VTR 100 of the present embodiment and is structured by a microcomputer, etc.

To this controller 13, the RF switching pulse RFSW generated in the head driving system not illustrated is supplied. The controller 13 utilizes this RF switching pulse RFSW for the recording/reproducing operation.

Moreover, to the controller 13, a liquid crystal monitor open/close detecting signal $S_{LCD}$ indicating the opening and closing condition of the liquid crystal monitor 102 is supplied. The liquid crystal monitor open/close detecting signal $S_{LCD}$ is output, for example, from the switch which is controlled ON or OFF, for example, depending on the opening and closing conditions of the liquid crystal monitor 102 as explained previously. The controller 13 executes the ON/OFF setting of the liquid crystal display mode depending on this liquid crystal monitor open/close detecting signal $S_{LCD}$.

Moreover, the controller 13 is also caused to output a capstan control signal $S_{CAP}$ to the capstan motor driving system not illustrated for variably controlling the rotating speed of the capstan. Thereby, the rotating speed of the capstan motor can be variably controlled depending on the various operation modes and reproduction mode or the head can be switched depending on the recording mode and the control can also be done to obtain the predetermined magnetic tape running speed.

In addition, the controller 13 generates and outputs a hold signal $S_H$ for executing the noiseless search when the liquid crystal display mode is ON as will be explained later.

<4. Structure of liquid crystal display>

Figure 4:
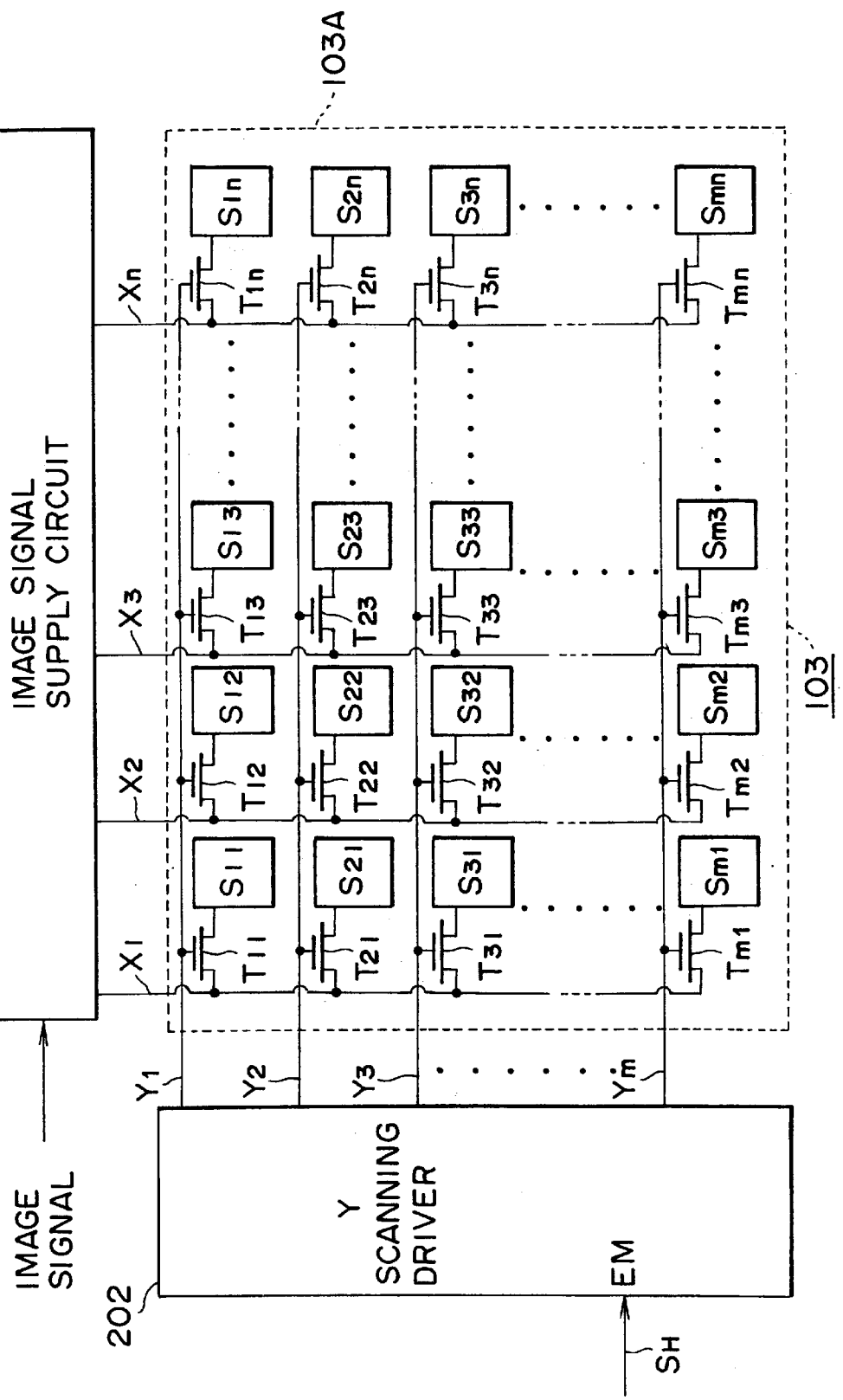
FIG. 4 is a diagram showing a structure example of a liquid crystal display apparatus.

FIG. 4 schematically shows an example of the structure of a liquid crystal display apparatus used for the liquid crystal display 103 of the embodiment.

In the liquid crystal display 103, pairs of are connected and arranged to the intersecting points of the signal supply lines X1 to Xn and signal lines Y1 to Ym. An opposite electrode 103A is provided opposed to the layout surface of the [switch element $T_{11}$, display electrode $S_{11}$] to [switch element $T_{mn}$, display electrode $S_{mn}$].

To an image signal supply circuit 201, an image signal of the pickup image or video reproduced image is supplied. This image signal supply circuit 201 is composed of the shift registers in the stages corresponding to the number of lines of the signal supply lines X1 to Xn and a sample hold circuit to which an outputs of the shift registers are supplied. The image signal supplied to the image signal supply circuit 201 is subjected to sample-hole for each horizontal line and is then supplied to the signal supply lines X1 to Xn in he timing synchronous to the horizontal synchronous signal.

A Y-scanning drive 202 sequentially applies the scanning signal to the signal lines Y1 to Ym in the timing of the horizontal synchronous signal in every field period.

Thereby, the image signal can be displayed since the image signal is supplied, in every field period, to the horizontal line where the [display electrode $S_{m1}$ to display electrode $S_{mn}$] are arranged from the horizontal line where [display electrode $S_{11}$ to display electrode $S_{1n}$].

In this embodiment, so-called "noiseless search" where noise bars do not appearing in the fast feeding/rewinding reproduction image displayed on the liquid crystal display 103 is realized by supplying the hold signal $S_H$ to the Y scanning driver 202 in the fast feeding/rewinding reproduction mode under the condition that the liquid crystal display mode is turned ON and by stopping the scanning signal to be output from the Y scanning driver 202 in different predetermined timing in every field period. However, this noiseless search will be explained later.

<5. Recording mode discrimination process in the embodiment>

In this embodiment, depending on the liquid crystal display mode which is turned ON or OFF, the setting for the tape running speed in the fast feeding/rewinding reproduction mode and for rotation/fixing of the standard pilot signal $S_{STD}$ in the REF pilot signal generating circuit (refer to FIG. 3) in the fast feeding/rewinding reproduction mode is made in the different manner. Such setting manner is made as shown in FIG. 5.

As the tape running speed in the fast feeding/rewinding reproduction mode, the even number times speed of the ordinary reproduction speed is set, as explained previously, when the liquid crystal display mode is ON and the odd number times speed of the ordinary reproduction speed is set when such liquid crystal display mode is OFF. In more practical, as shown in FIG. 5, when the liquid crystal display mode is ON, the +6 times speed of the ordinary reproduction speed is set as the tape running speed in the fast feeding reproduction mode, while the −6 times speed of the ordinary reproduction speed is set as the tape running speed in the rewinding reproduction speed is set.

On the other hand, when the liquid crystal display mode is OFF, the +9 times speed of the ordinary reproduction speed is set as the tape running speed in the fast feeding reproduction mode and the −7 times speed of the ordinary reproduction speed is set in the rewinding reproduction mode.

The tape running speed in the fast feeding/rewinding reproduction mode which is set as explained above is naturally different corresponding to the SP mode and LP mode of the reproduction mode of VTR. Namely, when the reproduction mode of VTR corresponds to the SP mode, the multiplied speed for the ordinary tape running speed (hereinafter referred to as the multiplied speed mode corresponding to SP mode) applied to the SP mode is set and when the reproduction mode of VTR corresponds to the LP mode, the multiplied speed for ordinary tape running speed (hereinafter referred to as the multiplied speed mode corresponding to LP mode) applied to the LP mode is set.

It is natural that the SP head is used for reproduction in the multiplied speed mode corresponding to the SP mode, while the LP head is used for reproduction in the multiplied speed mode corresponding to the LP mode.

In addition, the setting of the standard pilot signal $S_{STD}$ in the REF pilot signal generating circuit 2 (refer to FIG. 3) in the fast feeding/rewinding reproduction mode is made, when the liquid crystal display mode is ON, in such a manner as fixing to the pilot signal of only one particular frequency and is made, when the liquid crystal display mode is OFF, in such a manner as sequentially rotating the pilot signals $f_1$ to $f_4$ in the field timing.

Figure 6:
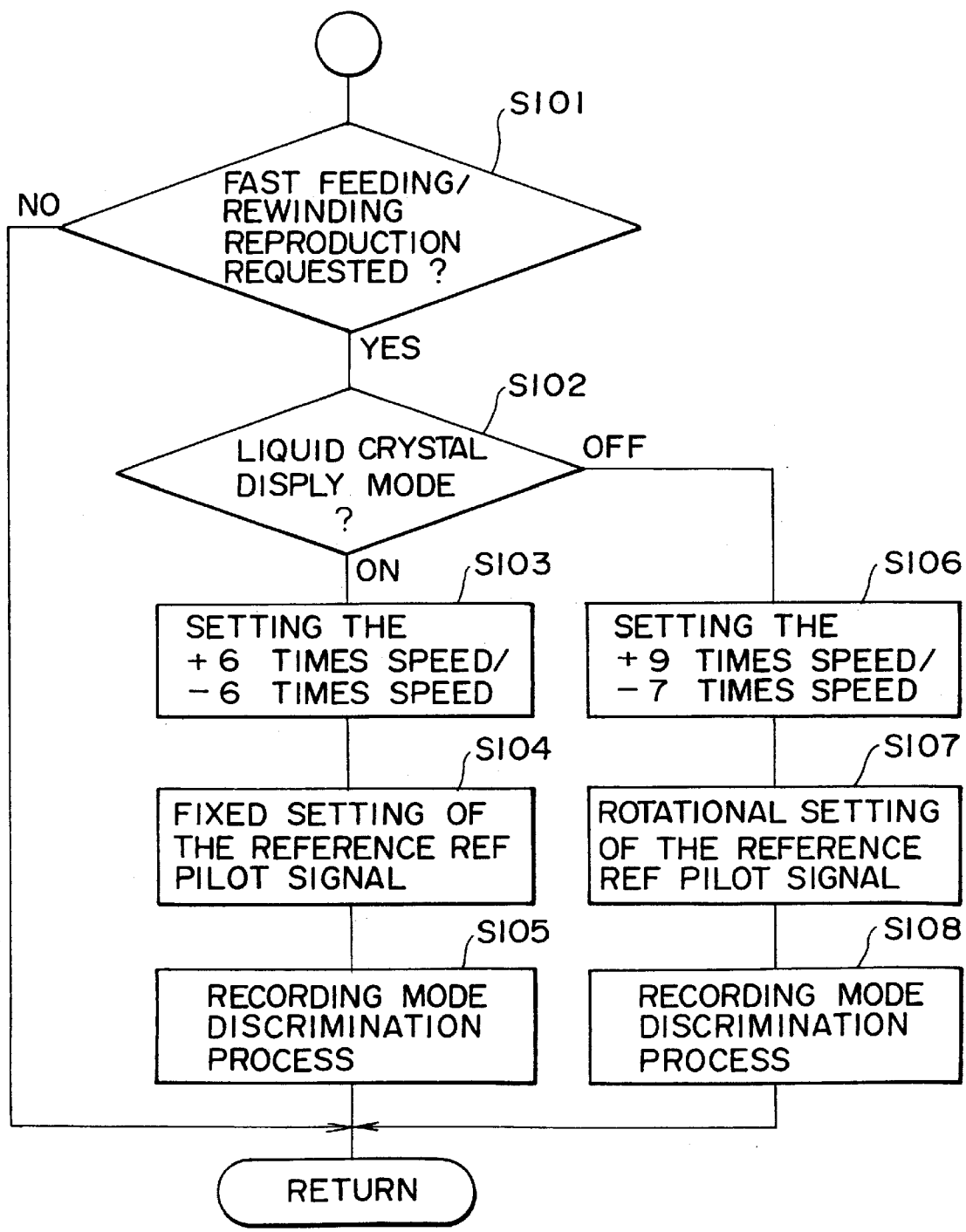
FIG. 6 is a flow chart showing the recording mode discriminating operation in the fast feeding/rewinding reproduction mode of the embodiment of the present invention.

FIG. 6 is a flow chart for realizing the recording mode discrimination process of a magnetic tape in the fast feeding/rewinding reproduction mode in the embodiment of the present invention. This discrimination process is executed by the controller 13 shown in FIG. 3.

In this routine, whether the fast feeding/rewinding reproduction request has been issued to the controller 13 or not is discriminated in the step S101. Issuance of this fast feeding/rewinding reproduction request is discriminated on the basis of the fact that the signal instructing the fast feeding/rewinding reproduction is supplied to the controller 13 or not, for example, by executing or not the predetermined manipulations for fast feeding/rewinding reproduction to the operation panel provided on the VTR 100 or to the keys provided on the remote controller.

In this step S101, when the fast feeding/rewinding reproduction request is not issued, the processing operation which has been executed is continued in the other routine. For example, when the ordinary reproducing operation has been executed in the stage before shifting to the step S101, the controller 13 executes the control for continuing the ordinary reproducing operation in the other processing routine.

On the other hand, when it is discriminated that the fast feeding/rewinding reproduction request is issued in the step S101, operation goes to the step S102.

In the step S102, it is discriminated that current liquid crystal display mode is ON or OFF, for example, depending on the liquid crystal monitor open/close detecting signal $S_{LCD}$. When the liquid crystal display mode is discriminated as ON, operation goes to the step S103. When the liquid crystal display mode is discriminated as OFF, operation goes to the step S106. The processes in the steps S103 to S105 are recording mode discrimination processes which are done when the liquid crystal display mode is set to ON and the tape running speed in the fast feeding/rewinding reproduction mode is set to the even number times of the ordinary reproduction speed and the processes in the steps S106 to S108 are recording mode discrimination processes which are done when the liquid crystal display mode is set to OFF and the tape running speed in the fast feeding/rewinding reproduction mode is set to the odd number times of the ordinary reproduction speed.

In the step S103, the +6 times speed of the ordinary speed is set as the tape running speed when the fast feeding/rewinding reproduction request in the step S101 is the fast feeding reproduction and the capstan control signal $S_{CAP}$ corresponding to this setting speed is output to the magnetic tape driving system. Thereby, the magnetic tape is caused to run in the +6 times speed of the ordinary speed. Meanwhile, when the fast feeding/rewinding reproduction request in the step S101 is the rewinding reproduction, the −6 times speed of the ordinary speed is set as the tape running speed and the capstan control signal $S_{CAP}$ is output for causing the magnetic tape to run at this tape running speed.

In the next step S104, the controller 13 controls the standard pilot signal $S_{STD}$ in the REF pilot signal generating circuit 2 to be fixed. Thereby, the REF pilot signal generating circuit 2 outputs the REF pilot signal $S_{REF}$ obtained based on the standard pilot signal $S_{STD}$ obtained as the fixed output to the multiplier 1.

In the subsequent step S105, the recording mode of the reproducing part of the magnetic tape which is driven in current is discriminated on the basis of the recording mode discriminating signal $S_D$ supplied to the controller 13 from the sample hold circuit 11.

The recording mode discriminating signal $S_D$ is obtained, as will be explained later, by sampling the tracking error signal $S_{ERR}$ in the predetermined timing for every field and the controller 13 discriminates the recording mode by monitoring the time series pattern of this recording mode discriminating signal $S_D$.

For example, while the fast feeding/rewinding reproducing operation is executed at the ±6 times speed of the ordinary speed as shown in FIG. 7, if the recording mode of the magnetic tape (SP mode/LP mode) is matched with the corresponding multiplied speed mode for tape running (multiplied speed corresponding to SP mode/multiplied speed corresponding to LP mode), the H level can be obtained continuously in the field period as the time series pattern of the recording mode discriminating signal $S_D$.

Moreover, when the condition where the recording mode of magnetic tape is SP mode and the tape running speed is set to the multiplied speed mode corresponding to SP mode is changed to the condition where the recording mode of the magnetic tape is changed to the LP mode, the times series pattern where the H level and L level appear alternately in the field period can be obtained in the recording mode discriminating signal $S_D$. Namely, the pattern (HLHLHLHL . . . ) appears.

Moreover, when the condition where the recording mode of magnetic tape is LP mode and the tape running speed is set to the multiplied speed corresponding to the LP mode is changed to the condition where the recording mode of magnetic tape is SP mode, the recording mode discriminating signal $S_D$ is expressed as (HXLXHXLXHXLX . . . (X is not inquired)). Namely, the time series pattern where H level and L level appear alternately in every other field appears in the recording mode discriminating signal. The reason why such time series pattern of the recording mode discriminating signal $S_D$ is obtained will be described later.

The controller 13 can discriminate the recording mode of the magnetic tape by discriminating a kind of the time series pattern of the actually supplied recording mode discriminating signal $S_D$ among the three kinds of pattern explained above.

In the step S106, when the fast feeding/rewinding reproduction request in the step S101 is the fast feeding reproduction, the +9 times speed of the ordinary speed is set as the tape running speed and the capstan control signal $S_{CAP}$ corresponding to this setting speed is output to the magnetic tape driving system to cause the magnetic tape to run at the +6 times speed of the ordinary reproduction speed. On the other hand, when the fast feeding/rewinding reproduction request in the step S101 is the rewinding reproducing operation, the −7 times speed of the ordinary speed is set as the tape running speed and the capstan control signal $S_{CAP}$ for causing the tape to run this tape speed is output.

The controller 13 executes the control, in the next step S107, so that the standard pilot signal $S_{STD}$ in the REF pilot signal generating circuit 2 is rotated in the field timing. Thereby, the REF pilot signal generating circuit 2 outputs the REF pilot signal $S_{REF}$ obtained on the basis of the standard pilot signal $S_{STD}$ which is set as the rotational signal to the multiplier 1.

Subsequently, in the step S108, the recording mode of the magnetic tape is discriminated on the basis of the recording mode discriminating signal $S_D$.

In this case, when the fast feeding/rewinding reproducing operation is being performed at the +9 times speed or −7 times speed of the ordinary speed as shown in FIG. 7 and the recording mode of magnetic tape is matched with the corresponding multiplied mode for running the tape, the H level is obtained continuously for every field as the time series pattern of the recording mode discriminating signal $S_D$.

Moreover, when the condition where the recording mode of the magnetic tape is SP mode and the tape running speed is matched with the multiplied speed mode corresponding to SP mode is changed to the condition where the recording mode of magnetic tape is changed to the LP mode, the time series pattern (HXLXHXLXHXLX . . . (X is not inquired)) appears in the recording mode discriminating signal $S_D$.

In addition, the condition where the recording mode of the magnetic tape is LP mode and the tape running speed is matched with the multiplied speed corresponding to the LP mode is changed to the condition where the recording mode of the magnetic tape is changed to the SP mode, the time series pattern (HHXXLLXXHHXXLLXXHH . . . (X is not inquired)) is obtained in the recording mode discriminating signal $S_D$. That is, in this pattern, the condition where H level continues for two fields and the condition where L level continues for two fields are appear alternately in every two fields. The reason why such times series pattern is obtained in the recording mode discriminating signal $S_D$ will be explained later.

In this case, the controller 13 can also discriminate the recording mode of the magnetic tape by discriminating that the time series pattern of the recording mode discriminating signal $S_D$ supplied actually takes any kind of pattern among the three kinds of patterns explained above.

In the step S105 or step S108, the discrimination result is determined, in order to avoid discrimination error, by monitoring whether the same time series pattern of the recording mode discriminating signal $S_D$ is obtained continuously or not, for example, for a plurality of predetermined field periods (for example, about 12 field periods).

Upon completion of the processes in the step S105 or step S108, the controller 13 once leaves this routine and controls the magnetic tape drive system and rotating head drive system in the other processing routine. Namely, the tape running speed corresponding to the magnetic tape recording mode discriminated in the step S105 or S108 can be obtained and reproduction is performed by the head corresponding to the magnetic tape recording mode.

<6. Time series pattern of recording mode discriminating signal>

(a. When the liquid crystal display mode is ON)

How the time series pattern of the recording mode discriminating signal shown in FIG. 7 is obtained in the recording mode discriminating circuit shown in FIG. 3 will explained hereunder and the situation when the liquid crystal display mode is ON (±6 times speed of the ordinary reproduction speed) will be explained first with reference to FIG. 8 to FIG. 19.

Figure 8:
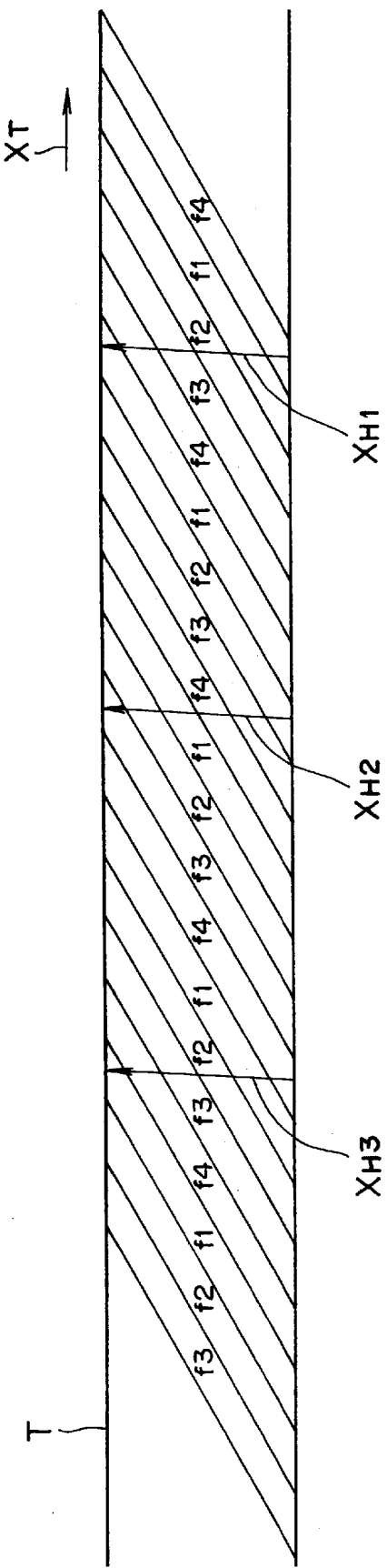
FIG. 8 is a diagram showing the tracing condition of a head for the track recorded on a magnetic tape.

FIG. 8 schematically shows the head tracing condition of the track on the magnetic tape. In this tracing condition, the fast feeding reproducing operation is performed under the condition that the liquid crystal display mode is ON and the magnetic tape recording mode is matched with the corresponding multiplied speed mode for running the tape.

Figure 9:
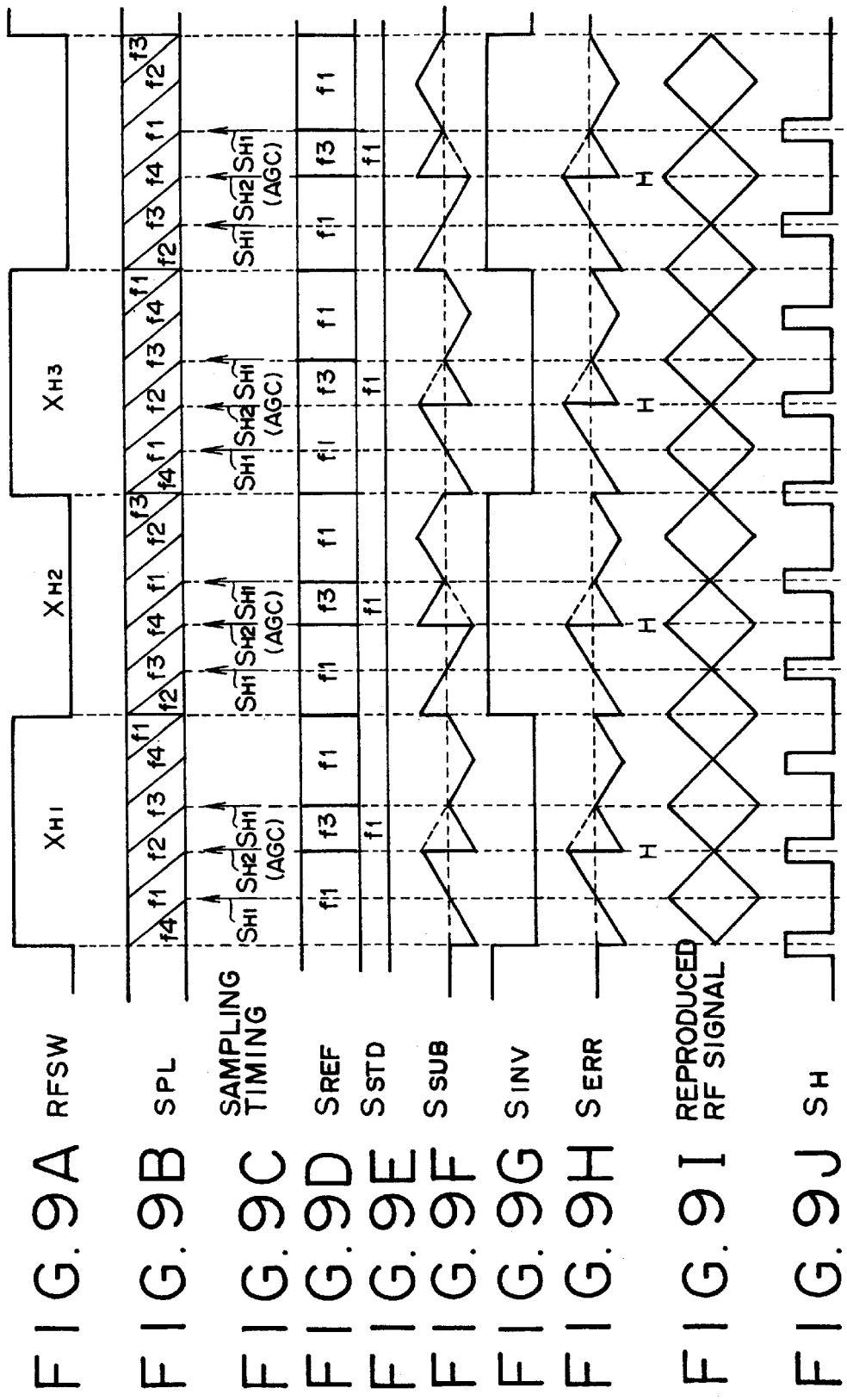
FIGS. 9A to 9J show a timing chart indicating operations of the essential portions obtained on the basis of the tracing condition of FIG. 8.

FIG. 9 is the timing chart indicating operations of the essential portion when the track is traced as shown in FIG. 8.

In FIG. 8, recording is made to the tracks of the magnetic tape T and the pilot signals ($f_1$, $f_2$, $f_3$, $f_4$) are recorded in each track by the recording operation. In the subsequent explanation, in order to identify one track, each track is called respectively as track $f_1$, track $f_2$, track $f_3$, track $f_4$ on the basis of the pilot signal.

When it is assumed that the magnetic tape is running at the +6 times speed of the ordinary reproduction speed along the tape running direction $X_T$, a pair of heads corresponding to the magnetic tape recording mode trace the tracks alternately in the sequence of the head tracing locus $X_{H1} \rightarrow X_{H2} \rightarrow X_{H3}$ . . . along the time axis. In this case, the each head trace locus $X_{H1}, X_{H2}, X_{H3}$ is sequentially traced actually in such a manner as diagonally crossing the six tracks.

For example, when the head trace locus $X_{H1}$ is assumed to be started from the track $f_4$ shown in the figure, this trace is terminated in the track $f_1$. The head trace locus $X_{H2}$ is started from the track $f_2$ immediately after the track $f_1$ as the final trace of the head trace locus $X_{H1}$ and is terminated in the track $f_3$ after the five tracks. The head trace locus $X_{H3}$ is started from the track $f_4$ immediately after the track $f_3$ as the final trace of the head trace locus $X_{H2}$ and provides the trace condition like the head trace locus $X_{H1}$.

In this case, the heads corresponding to the head trace loci $X_{H1}$ and $X_{H3}$ match in the azimuth with the tracks $f_1$, $f_3$, and the head corresponding to the head trace locus $X_{H2}$ matches in the azimuth with the tracks $f_2$, $f_4$.

FIG. 9 is then explained hereunder under the condition of the trace as explained above.

FIG. 9A shows the RF switching pulse RFSW supplied to the controller 13. The section where the RF switching pulse RFSW is inverted corresponds to one field period where one head traces once the magnetic tape.

As a result that the trace is performed in such a manner crossing the track at the +6 times speed of the ordinary speed as shown in FIG. 8, the envelope waveform as shown, for example, in FIG. 9I can be obtained as the reproduced RF signal. Moreover, the reproduced pilot signal $S_{PL}$.

As explained in regard to FIG. 5, when the liquid crystal display mode is ON, the standard pilot signal $S_{STD}$ set in the REF pilot signal generating circuit 2 does not rotate in every field period but is set to be fixed, for example, to the frequency $f_1$. This condition is shown in FIG. 9E. The REF pilot signal $S_{REF}$ generated on the basis of above setting is output as the signal which rotates, as shown in FIG. 9D, as $f_1 \rightarrow f_3 \rightarrow f_1$ in the timing shown in the figure for every field because the frequency $f_1$ is switched to $f_3$ (inverted pilot signal) in the predetermined period of one field period. As explained above, by changing the frequency of pilot signal in the predetermined period of one field period, the waveform of the tracking error signal $S_{ERR}$ (and subtraction output signal $S_{SUB}$) may be inverted only during this period (the original waveforms are respectively shown by the broken lines in FIGS. 9F and 9H). Detail explanation is omitted here but the artificial lock can be prevented here by the process explained above.

An arithmetic output signal $S_{SUB}$ of the subtractor 7 obtained on the basis of the reproduced pilot signal $S_{PL}$ shown in FIG. 9B and the REF pilot signal $S_{REF}$ shown in FIG. 9D is shown in FIG. 9F. The controller 13 also outputs the inverted control signal $S_{INV}$ to the switch circuit 9 as the pulse waveform which is inverted in the field timing shown in FIG. 9G. The switch circuit 9 operates to switch the inverted control signal $S_{INV}$ to the terminal $T_{11}$ side while it is in the H level. Thereby, the tracking error signal $S_{EER}$ output from the switch circuit 9 has the waveform shown in FIG. 9H.

In the waveforms of the arithmetic output signal $S_{SUB}$ of FIG. 9F and the tracking error signal $S_{ERR}$ of FIG. 9H, the part indicated by the broken line is equal to the waveform obtained when the standard pilot signal $S_{STD}$ is supplied to the multiplier 1. However, in this embodiment, even when the standard pilot signal $S_{STD}$ is supplied to the multiplier 1 in place of the REF pilot signal $S_{REF}$, the recording mode can be discriminated by the controller 13 because at least the time series pattern of the recording mode discriminating signal $S_D$ does not change.

FIG. 9C shows, as the sampling timing of the tracking error signal $S_{ERR}$, the output timings, using the arrow marks, of the sample hold control signal $S_{H1}$ for the sample hold circuit 10 and sample hold control signal $S_{H2}$ for the sample hold circuit 11.

The sample hold control signal $S_{H1}$ is output twice in the timing shown in FIG. 9C in one field period and the sample hold circuit 10 samples the tracking error signal $S_{ERR}$ in this timing. The sample hold output of this sample hold circuit 10 is actually used for the tracking control.

Moreover, the sample hold control signal $S_{H2}$ is once output in the timing shown in FIG. 9C in one field period. An output obtained by sample-holding the tracking error signal $S_{ERR}$ in this timing in the sample hold circuit 11 is transmitted to the controller 13 as the recording mode discriminating signal $S_D$.

When attention is paid to the tracking error signal $S_{ERR}$ at the timing corresponding to the sample timing by the sample hold control signal $S_{H2}$ (FIG. 9C), it is known that the H level can be obtained continuously in the field period as the value of this signal as is noted in the lower side of the waveform of FIG. 9H. As a result, the time series pattern (HHHHHH . . . ) explained in regard to FIG. 7 can be obtained.

As the sample timing of the sample hold control signal $S_{H2}$, the position where the level of the tracking error signal $S_{ERR}$ is inverted is indicated by the arrow mark in FIG. 9C. However, the level of the tracking error signal $S_{ERR}$ in the timing immediately before level inversion of the tracking error signal $S_{ERR}$ is actually output in the timing of the sample hold.

As noted as (AGC) in the figure, the sample timing of the sample hold control signal $SH_2$ shown in FIG. 9C is actually matched with the timing of the sample hold of the signal level to be used for AGC to the tracking error signal $S_{ERR}$ which has been executed in the related art. Therefore, in this embodiment, it is no longer required to set the sample hold timing for newly obtaining the recording mode discriminating signal $S_D$ and the sample timing of the AGC may be used.

The controller 13 generates a timing hold signal $S_H$ shown in FIG. 9J. In this case, the hold signal $S_H$ becomes H level corresponding to the period where the amplitude of the reproduced RF signal (FIG. 9I) is small. The period where the amplitude of the reproduced RF signal is small corresponds to the position where noise bar appears in the liquid crystal display screen.

In the period where the hold signal $S_H$ becomes H level because this hold signal $S_H$ is supplied to the enable terminal of the Y scanning driver 202 shown in FIG. 4, output of the scanning signal to be supplied to the signal lines Y1 to Yn from the Y scanning driver 202 is stopped.

In this case, since the tape running speed is set to the even number times the speed in the ordinary reproduction mode, amplitude pattern of the envelope of the reproduced RF signal shown in FIG. 9I is deviated for every one field and the same pattern may be obtained in every other field.

Accordingly, as the liquid crystal display image at the position corresponding to the period where the hold signal $S_H$ becomes H level and the scanning signal from the Y scanning driver 202 is stopped, the condition where an image of the preceding field is held and displayed is sequentially continued. Thereby, the fast feeding reproduced image including no noise bar can be displayed on the liquid crystal display 103 (refer to FIG. 1).

Figure 10:
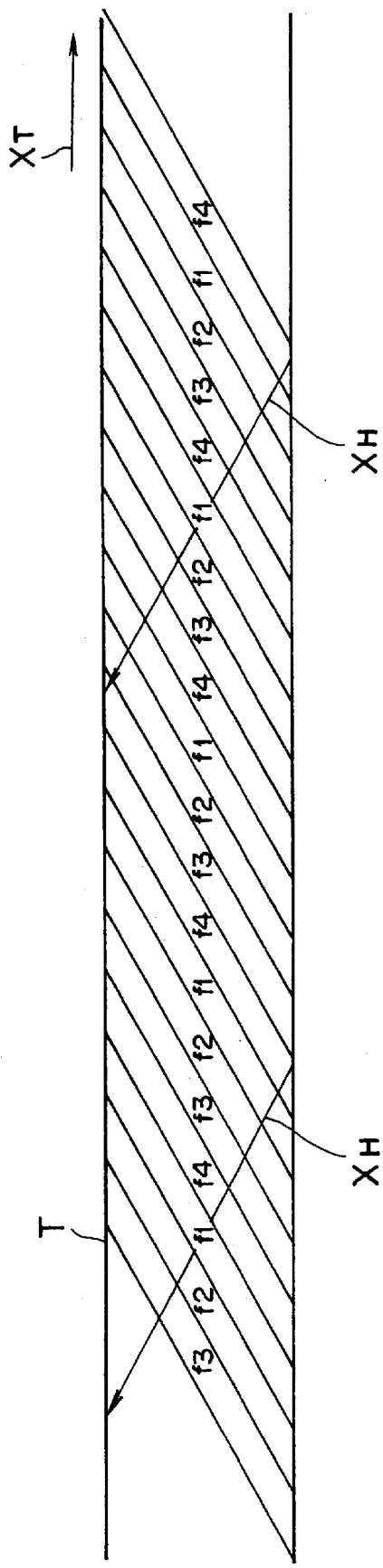
FIG. 10 is a diagram showing the tracing condition of a head for the track recorded on a magnetic tape.

FIG. 10 shows the trace condition of the magnetic tape T by the head when the recording mode of magnetic tape is changed to the LP mode from the SP mode while the fast feeding reproducing operation is performed at the +6 times speed as the reproduction mode corresponding to the SP mode. Namely, the track of the magnetic tape is set to the LP mode, although the magnetic tape T is running in the multiplied speed mode corresponding to the SP mode and the head for SP mode is tracing the tape.

In this case, the head for SP mode traces the tape for 12 tracks (LP mode) in every field period as indicated by head trace loci $X_H$, $X_{H'}$. In this case, the first head trace locus $X_H$, for example, is started from the track $f_4$, this trace is terminated in the track $f_3$ after 11 tracks. The subsequent head trace locus $X_H$ is started from the track $f_4$ immediately after the preceding track $f_3$ and is terminated in the track $f_3$. Such operation is repeated.

Figure 11:
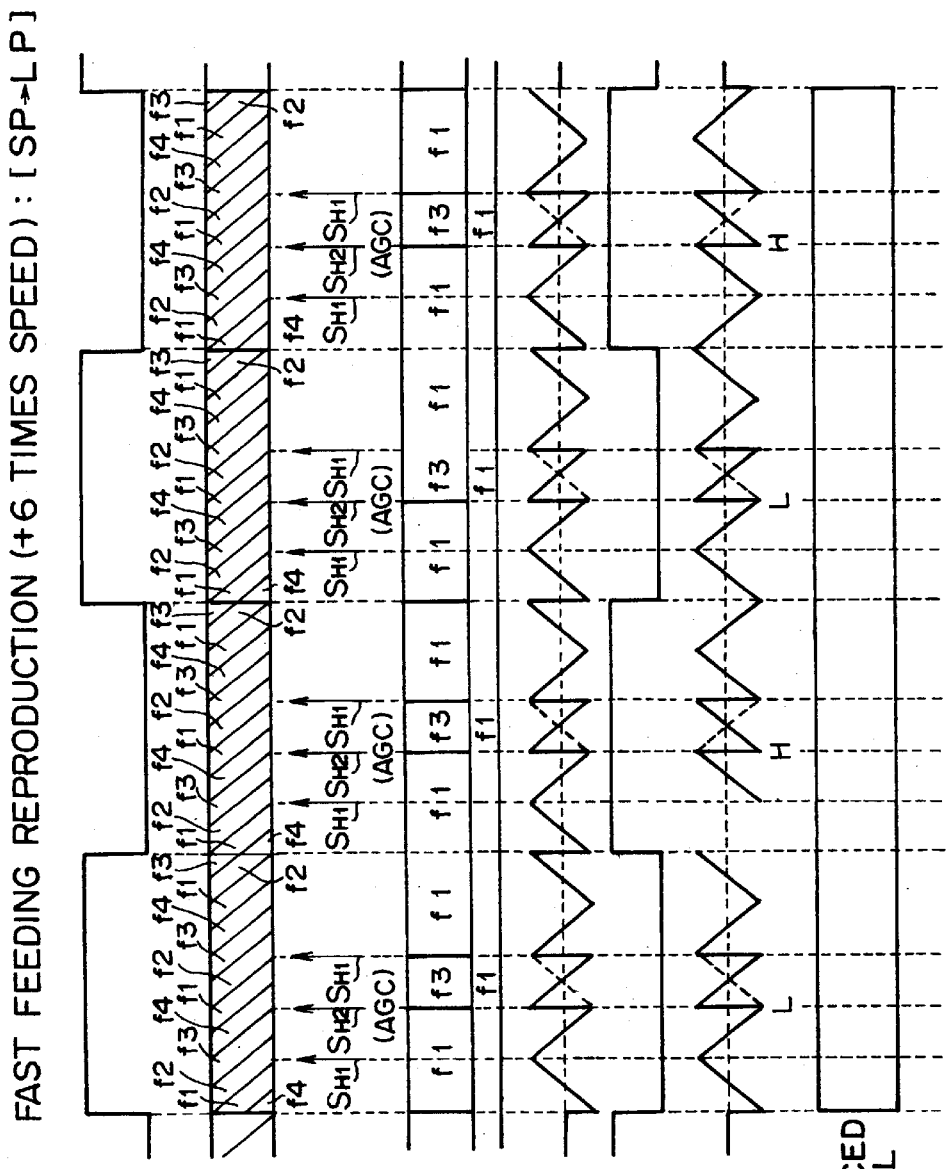
FIGS. 11A to 11I show a timing chart indicating operations of the essential portions obtained on the basis of the tracing condition of FIG. 10.

FIG. 11 is a timing chart showing the operation of the essential portions corresponding to the case where the magnetic tape is traced as indicated in FIG. 10. The same portion as that in FIG. 9 is designated by the same reference numeral and the same explanation is omitted here.

In this case, the reproduced RF signal is obtained in such a condition as shown in FIG. 11I that the envelope is in the constant level. This is because the LP mode track is traced by the head for SP mode. Namely, since the SP mode head always traces a couple of adjacent LP mode tracks. As a result, the signal of the tracks in which azimuth is always matched is reproduced.

Moreover, the waveform of the reproduced pilot signal $S_{PL}$ is shown in FIG. 11B.

Since the REF pilot signal $S_{REF}$ (FIG. 11D) based on the standard pilot signal $S_{STD}$ (FIG. 11E) of which frequency is fixed to $f_1$ is supplied to the multiplier 1 for such reproduced pilot signal $S_{STD}$ the arithmetic output signal $S_{SUB}$ of the subtractor 7 and the tracking error signal $S_{ERR}$ output from the switch circuit 9 have the waveform shown in FIG. 11F and FIG. 11H, respectively.

As the recording mode discriminating signal $S_D$, the time series pattern (LHLHLH . . . ) can be obtained by sampling the tracking error signal $S_{ERR}$ once in one field in the timing of the sample hold control signal $S_{H2}$ shown in FIG. 11C, indicating that the time series pattern (HLHLHL . . . ) explained in regard to FIG. 7 is obtained. As a manner in which the time series pattern appears, it is not inquired that the first level is H level or L level in the recording mode discriminating signal $S_D$.

Figure 12:
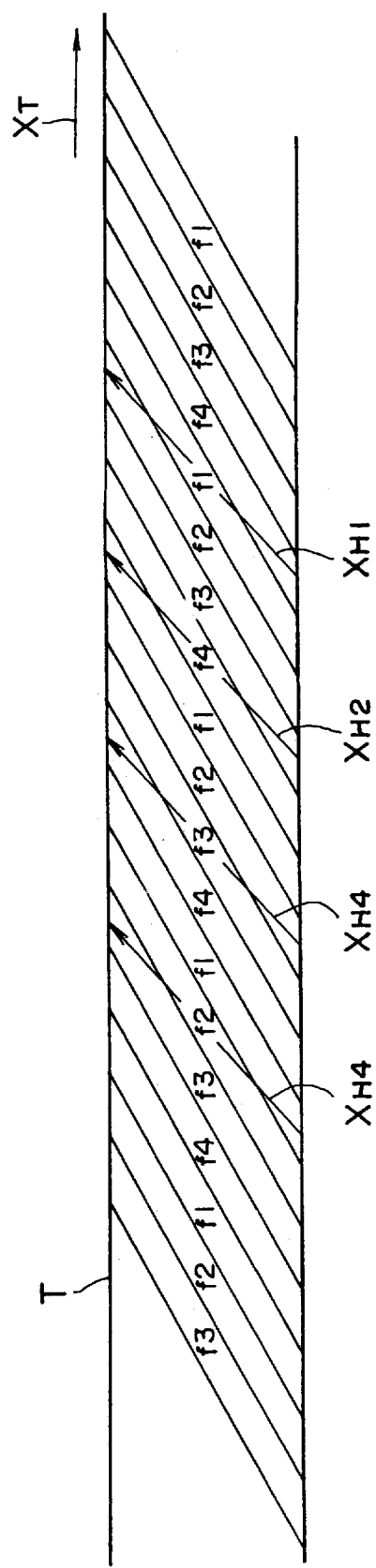
FIG. 12 is a diagram showing the tracing condition of a head for the track recorded on a magnetic tape.

FIG. 12 shows the trace condition of the magnetic tape T by the head when the magnetic tape recording mode is changed to the SP mode from the LP mode while the fast feeding reproducing operation is performed at he +6 times speed as the multiplied speed mode corresponding to the LP mode. In this case, the magnetic tape T is running in the multiplied speed mode corresponding to the LP mode and is traced by the LP mode head but the track of the magnetic tape is in the SP mode.

In such a case, the LP mode head traces the three tracks of the SP mode in every one field as indicated by the head trace loci $X_{H1}$ to $X_{H4}$. In this case, when the head trace locus $X_{H1}$ is started from the track $f_4$, the trace is terminated in the track $f_2$ after two tracks and the subsequent head trace locus $X_{H2}$ is started from the track $f_3$ immediately after the track $f_2$ and is terminated in the track $f_3$ after two tracks. For the head trace locus $X_{H3}$, trace is executed from the subsequent track $f_2$ to the track $f_4$ after two tracks and moreover for the head trace locus $X_{H4}$, trace is executed from the track $f_1$ immediately after the track $f_4$ to the track $f_3$ after two tracks.

As a result of such trace, the reproduced pattern of the reproduced pilot signal $S_{PL}$ is once circulated by the four times of the tracing operation indicated by the head trace loci $X_{H1}$ to $X_{H4}$. Namely, the reproduced pattern of the intrinsic reproduced pilot signal $S_{PL}$ can be obtained in unit of four fields. This condition is shown in FIG. 13B which will be explained next.

Figure 13:
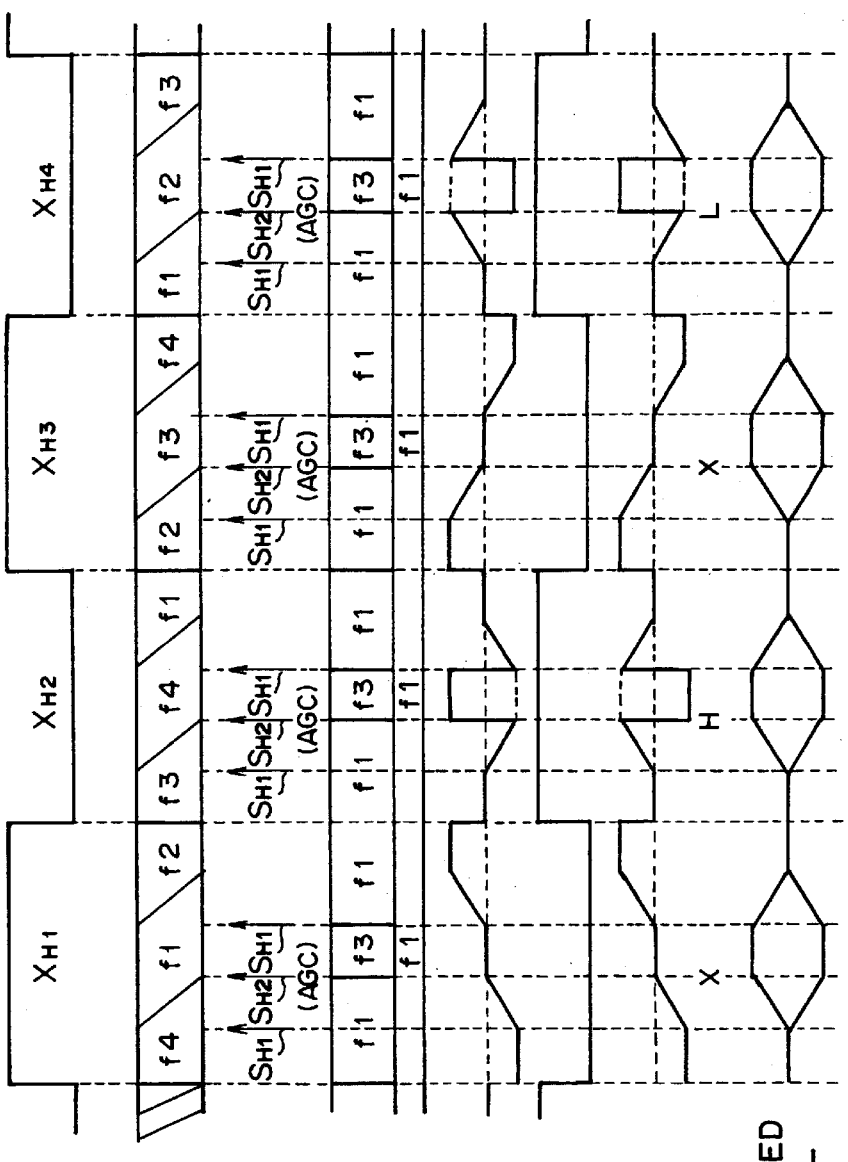
FIGS. 13A to 13I show a timing chart indicating operations of the essential portions obtained on the basis of the tracing condition of FIG. 12.

FIG. 13 is a timing chart indicating operations of the essential portions corresponding to the case where the magnetic tape is traced as shown FIG. 11. The same portions as those of FIG. 9 and FIG. 11 are designated by the same reference numerals and the same operation is not explained here.

In this case, since the LP mode head traces the track of the SP mode in the track pitch almost two times that of the LP mode, the reproduced RF signal can obtain the envelope change corresponding to the track of the same azimuth as shown in FIG. 13I. In this case, the reproduced pilot signal $S_{PL}$ has the waveform as shown in FIG. 13B because the track is traced as explained in regard to FIG. 12.

As a result that the REF pilot signal $S_{REF}$ (FIG. 13D) based on the standard pilot signal $S_{STD}$ (FIG. 13E) fixed to the frequency $f_1$ is supplied to the multiplier 1 for such reproduced pilot signal $S_{PL}$ the arithmetic output signal $S_{SUB}$ of the subtractor 7 and the tracking error signal $S_{ERR}$ output from the switch circuit 9 respectively have the waveform as shown in FIG. 13F and FIG. 13H.

Therefore, the recording mode discriminating signal $S_D$ has the time series pattern (XHXL . . . ) by sampling the tracking error signal $S_{ERR}$ once in every field in the timing of the sample hold control signal $S_{H2}$ shown in FIG. 13C and this pattern matches the time series pattern (HXLXHXLX . . . ) explained in FIG. 7. In this case, the mode discriminating signal $S_D$ may be started by any signal of H level, L level or X(not inquired).

Figure 14:
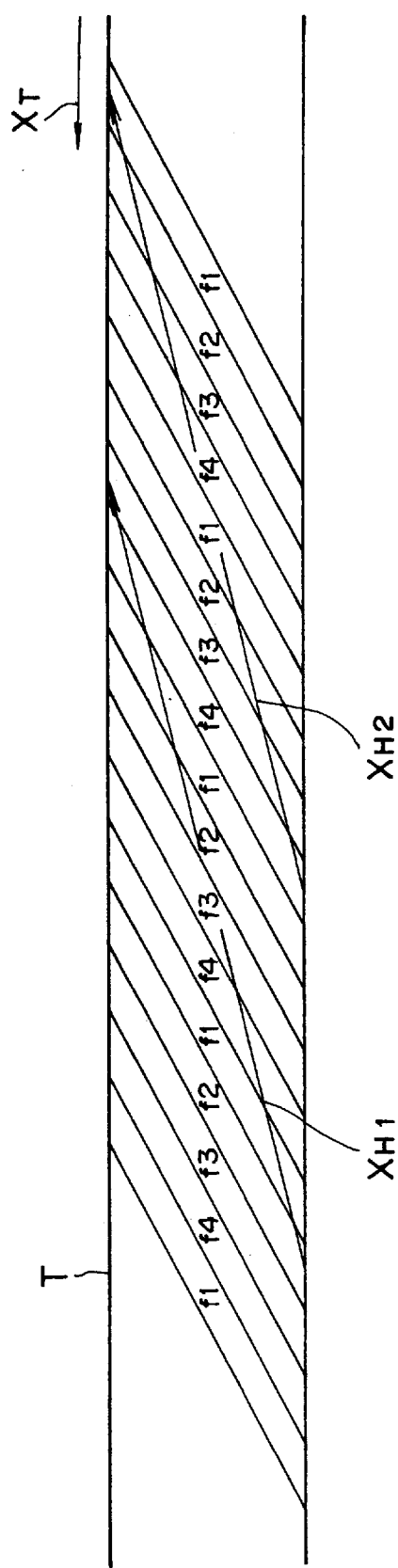
FIG. 14 is a diagram showing the tracing condition of a head for the track recorded on a magnetic tape.

FIG. 14 shows the trace condition of track in such a case that the magnetic tape recording mode matches the corresponding multiplied speed for tape running as the rewinding reproduction mode under the condition that the liquid crystal display mode is ON.

In this case, the magnetic tape T is driven at the −6 times speed of the ordinary reproduction speed and the tape runs in the tape running direction $X_T$ inverted from the direction of the fast feeding reproduction mode.

In this case, the head traces eight tracks in every field period. For example, if the head starts the trace from the track $f_2$ as indicated by the head trace locus $X_{H1}$, the trace terminates in the track $f_2$ after the seven tracks. In the subsequent head trace locus $X_{H2}$, the trace is started from the track which is located after the track $f_3$ and is terminated in the track $f_1$ which is located after seven tracks therefrom. In this case, an intrinsic output pattern of the reproduced pilot signal $S_{PL}$ can be obtained by the twice traces (in unit of two fields) indicated by the head trace loci $X_{H1} \rightarrow X_{H2}$ ($X_{H2} \rightarrow X_{H1}$).

Figure 15:
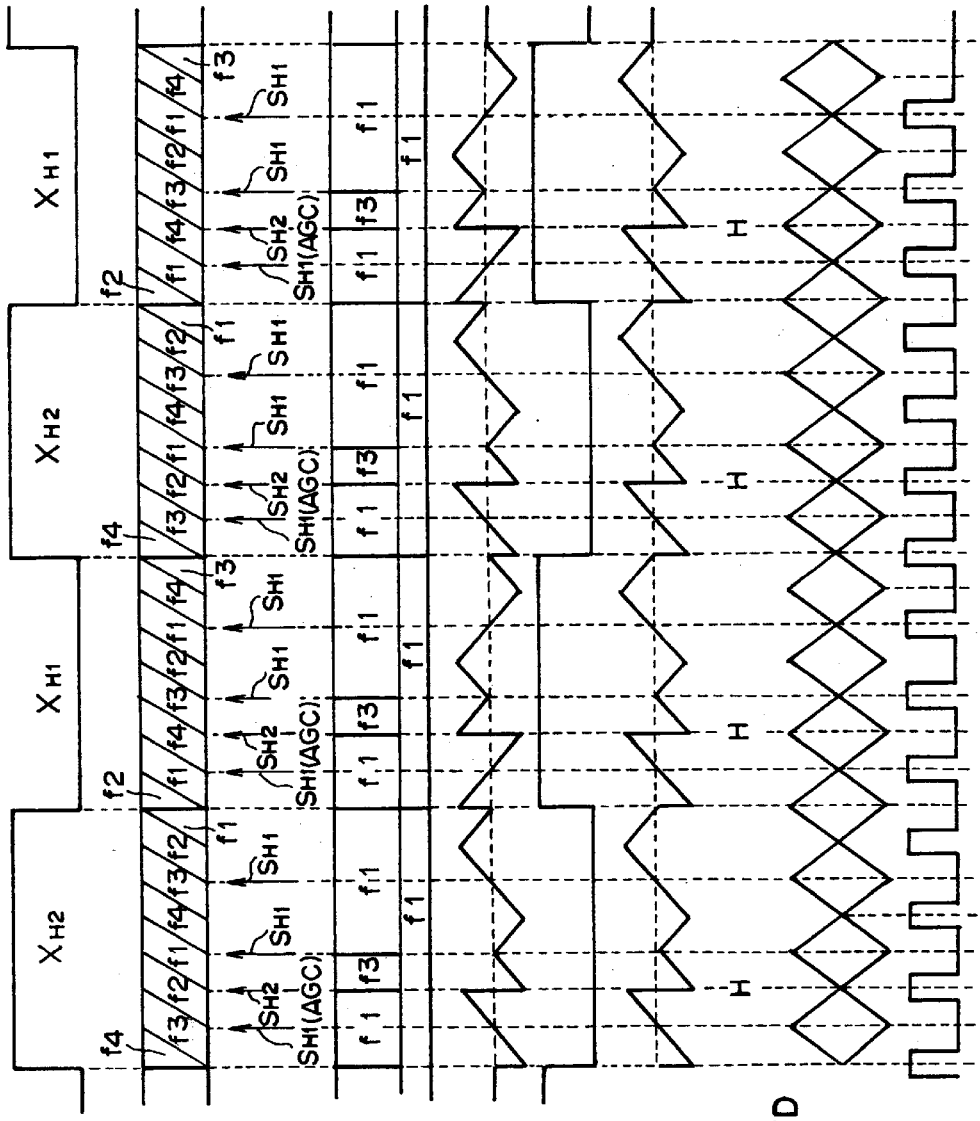
FIGS. 15A to 15J show a timing chart indicating operations of the essential portions obtained on the basis of the tracing condition of FIG. 14.

FIG. 15 is a timing chart indicating operations of the essential portions corresponding to the trace operation shown in FIG. 14. The same portions as those in the flow charts explained previously are designated by the same codes and the same explanation is omitted here.

Since the trace is performed as shown in FIG. 14, the reproduced pilot signal $S_{PL}$ shown in FIG. 15B is obtained and the reproduced RF signal has the waveform including the change of envelope as shown in FIG. 15I.

Since the REF pilot signal $S_{REF}$ (FIG. 15D) based on the standard pilot signal (FIG. 15E) which is fixed to the frequency $f_1$ is supplied to the multiplier 1 for the reproduced pilot signal $S_{PL}$ shown in FIG. 15B, the arithmetic output signal $S_{SUB}$ of the subtractor 7 and the tracking error signal $S_{ERR}$ output from the switch circuit 9 respectively have the waveforms shown in FIG. 15F and FIG. 15H.

The recording mode discriminating signal $S_D$ has the time series pattern (HHHH . . . ) by sampling the tracking error signal $S_{ERR}$ once in every field in the timing of the sample hold control signal $S_{H2}$ shown in FIG. 15C and this pattern matches the time series pattern explained in regard to FIG. 7.

In this case, since the tape running speed is also set to the even number times speed of the ordinary reproduction speed, amplitude pattern of the reproduced RF signal shown in FIG. 15I is deviated in every field and thereby the same pattern is obtained in every other field.

Therefore, the controller 13 generates, as shown in FIG. 15J, the hold signal $S_H$ which becomes H level corresponding to the period where the envelope amplitude of the reproduced RF signal (FIG. 15I) is small and then outputs this hold signal to the enable terminal of the Y scanning driver 202. Thereby, as explained in regard to FIG. 9J, the fast feeding reproduction mode image having no noise bars is displayed on the liquid crystal display 103 (refer to FIG. 1).

Figure 16:
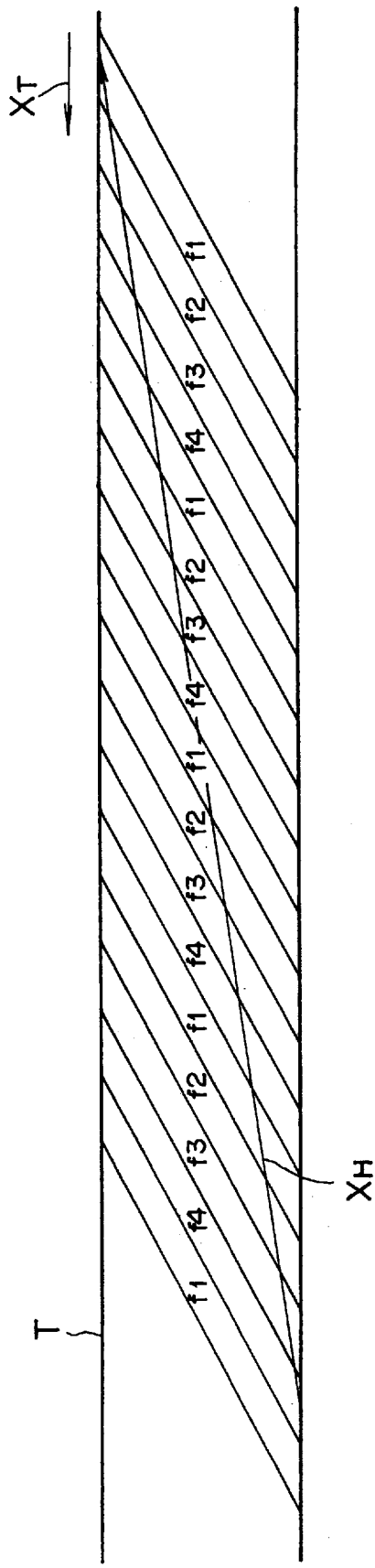
FIG. 16 is a diagram showing the tracing condition of a head for the track recorded on a magnetic tape.

FIG. 16 shows the trace condition of the magnetic tape T by the head when the magnetic tape recording mode is changed to the LP mode from the SP mode while the rewinding production is performed at the −6 times speed as the multiplied speed mode corresponding to the SP mode. In this case, the magnetic tape T is running at he multiplied speed mode corresponding to the SP mode and is traced by the SP mode head but the magnetic tape track is LP mode.

In this case, as indicated as the head trace locus $X_H$, the SP mode head traces 16 tracks of the LP mode track in every field. In this case, if the first head trace locus $X_H$ is started from the track $f_4$, the trace is terminated in the track $f_1$ after 15 tracks. The pattern of the reproduced pilot signal obtained by this trace is repeated in every field.

Figure 17:
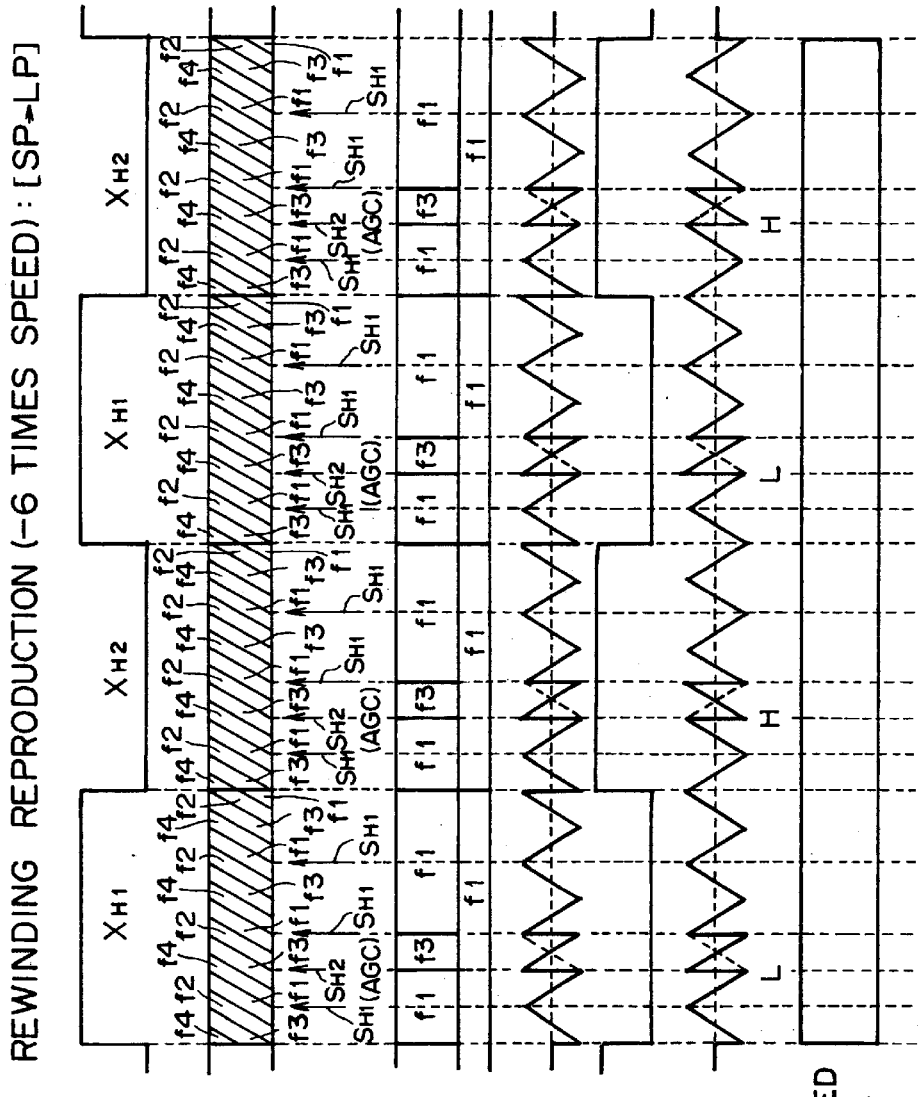
FIGS. 17A to 17I show a timing chart indicating operations of the essential portions obtained on the basis of the tracing condition of FIG. 16.

FIG. 17 is the timing chart indicating operations of the essential portions corresponding to the trace of magnetic tape as shown in FIG. 16. The same portions as those in the timing charts explained previously are designated by the same code and the same explanation is not repeated here.

In this case, the reproduced RF signal almost not including any change of envelope can be obtained as shown in FIG. 17I with the same reason as explained in regard to FIG. 11I.

Moreover, the reproduced pilot signal $S_{PL}$ has the waveform as shown in FIG. 17B.

Since the REF pilot signal $S_{REF}$ (FIG. 17D) based on the standard pilot signal $S_{STD}$ (FIG. 17E) which is fixed in the frequency $f_1$ is supplied to the multiplier 1 for the reproduced pilot signal $S_{PL}$, the arithmetic output signal $S_{SUB}$ of the subtractor 7 and the tracking error signal $S_{ERR}$ output from the switch circuit 9 have the waveforms respectively shown in FIG. 17F and FIG. 17H.

Moreover, since the tracking error signal $S_{ERR}$ is sampled once in every field in the timing of the sample hold control signal $S_{H2}$ shown in FIG. 17C, the recording mode discriminating signal $S_D$ has the time series pattern (LHLHLH ...) in every field and this pattern well matches with the time series pattern (HLHLHL ...) explained in regard to FIG. 7. In the case of this time series pattern, the recording mode discriminating signal $S_D$ may be started by any signal of the H level or L level.

Figure 18:
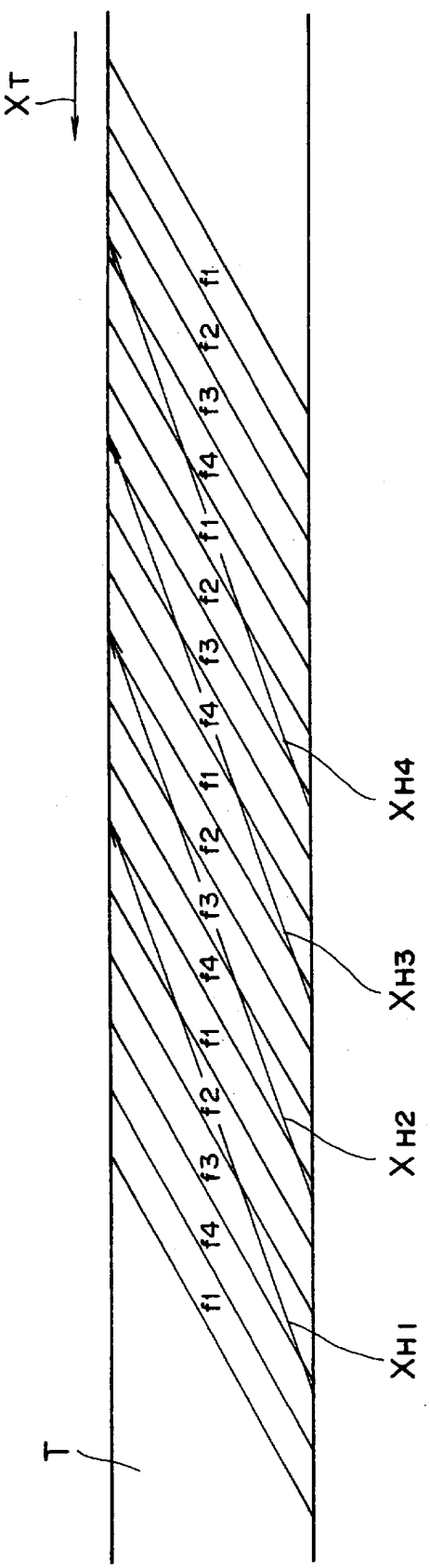
FIG. 18 is a diagram showing the tracing condition of a head for the track recorded on a magnetic tape.

FIG. 18 shows the trace condition of the magnetic tape by the head when the tape recording mode is changed to the SP mode from the LP mode while the fast feeding reproducing operation is performed at the −6 times speed as the multiplied speed mode corresponding to the LP mode. In this case, the magnetic tape T is running in the multiplied speed mode corresponding to the LP mode and is traced by the LP mode head, while the track of the magnetic tape is SP mode.

In such a case, as indicated by the head trace loci $X_{H1}$ to $X_{H4}$, the LP mode head traces five tracks of the SP mode track in every field. However, only a small amount of signal is read from the track traced finally.

In this case, if the head trace locus $X_{H1}$ is started from the track $f_4$, this trace is terminated in the track $f_4$ located after four tracks therefrom. The subsequent head trace locus $X_{H2}$ is started from the track $f_1$ which is located after one track from the track $f_4$ traced finally in the head trace locus $X_{H1}$ and is terminated in the track $f_1$ after four tracks therefrom. The next head trace locus $X_{H3}$ is started from the track $f_2$ which is located after one track from the track $f_1$ traced finally in the head trace locus $X_{H2}$ and is terminated in the track $f_2$ after four tracks from the track $f_2$. Moreover, the next head trace locus $X_{H4}$ is started from the track $f_3$ located one track after the track $f_2$ traced finally in the head trace locus $X_{H3}$ and is terminated in the track $f_3$ after four tracks from the track $f_3$.

The appearing patterns of the reproduced pilot signal $S_{PL}$ makes a turn by the trace operation of four times (four field periods) indicated by the head trace loci $X_{H1}$ to $X_{H4}$.

Figure 19:
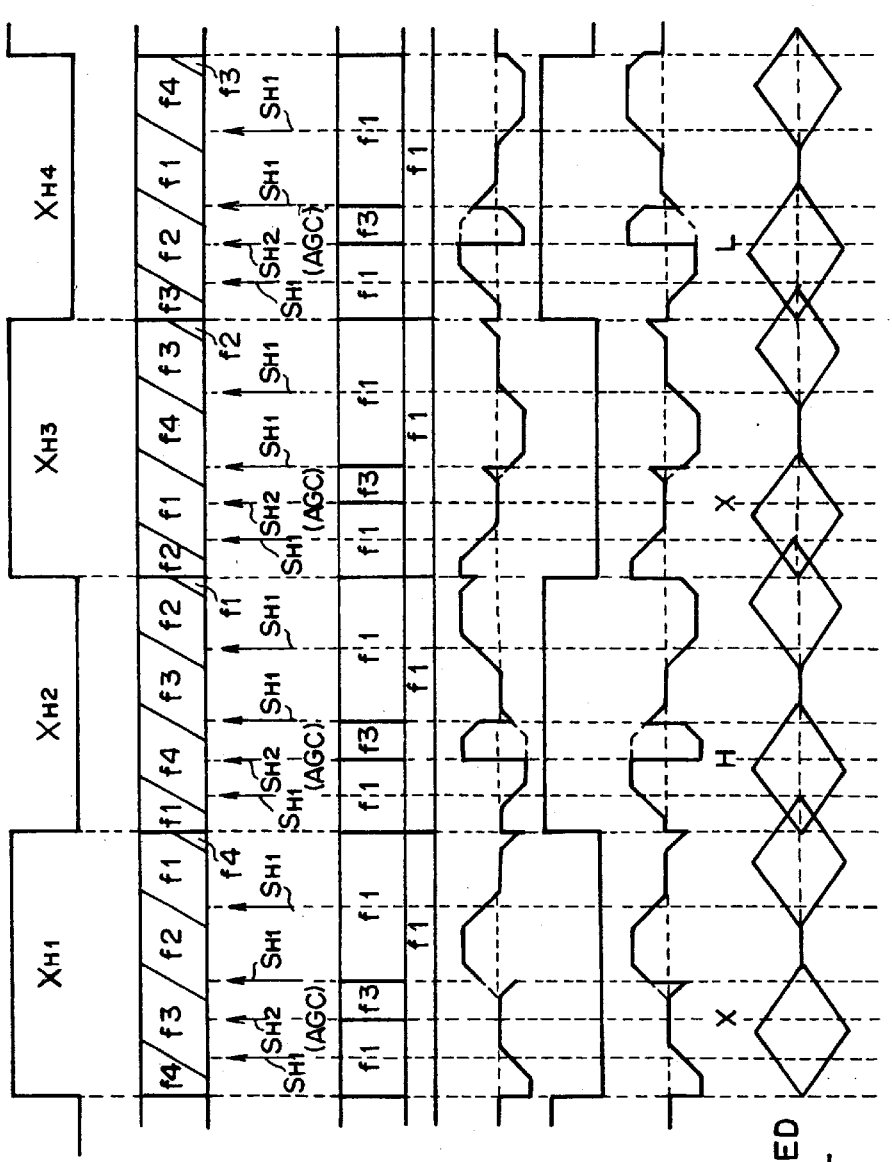
FIGS. 19A to 19I show a timing chart indicating operations of the essential portions obtained on the basis of the tracing condition of FIG. 18.

FIG. 19 is a timing chart indicating operations of the essential portions corresponding to the case where the magnetic tape is traced as shown in FIG. 18. The same portions as those of the timing charts explained previously are designated by the same codes and the same explanation is not repeated here.

In this case, the reproduced RF signal obtains amplitude change of envelope corresponding to the track of the same azimuth as shown in FIG. 19I. In this case, the reproduced pilot signal $S_{PL}$ has the waveform shown in FIG. 19B because the track is traced as explained in regard to FIG. 18.

Since the REF pilot signal $S_{REF}$ (FIG. 19D) based on the standard pilot signal $S_{STD}$ (FIG. 19E) fixed to the frequency $f_1$ is also supplied to the multiplier 1 for the reproduced pilot signal $S_{PL}$, the arithmetic output signal $S_{SUB}$ of the subtractor 7 and the tracking error signal $S_{ERR}$ output from the switch circuit 9 have the waveforms respectively shown in FIG. 19F and FIG. 19H.

The recording mode discriminating signal $S_D$ has the time series pattern (XHXL ...) by sampling the tracking error signal $S_{ERR}$ once in every field in the timing of the sample hold control signal $S_{H2}$ shown in FIG. 19C. This pattern well matches with the time series pattern (HXLXHXLX ...) explained in regard to FIG. 7. In this case, the mode discriminating signal $S_D$ may also be started by any signal of the H level, L level or by X (not inquired).

(b. When liquid crystal display mode is OFF)

Figure 20:
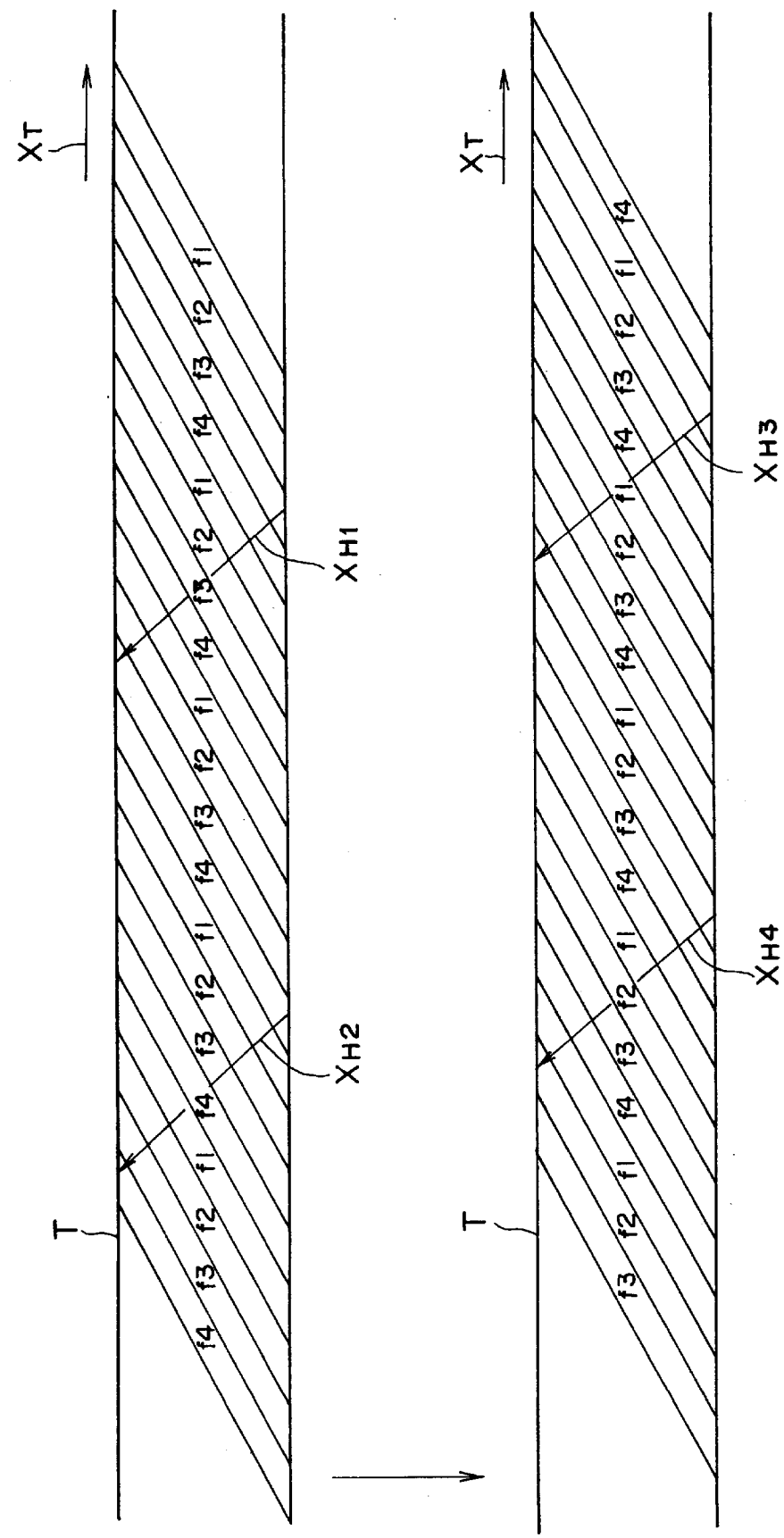
FIG. 20 is a diagram showing the tracing condition of a head for the track recorded on a magnetic tape.

FIG. 20 shows the trace condition of track when the magnetic tape recording mode matches the corresponding multiplied speed mode for running the magnetic tape while the fast feed reproduction is performed under the condition that the liquid crystal display mode is OFF.

In this case, the magnetic tape T is running at the −6 times speed of the ordinary reproduction speed along the forward tape running direction $X_T$.

Under this condition, the head traces nine tracks in every field period. For example, as indicated by the head trace locus $X_{H1}$, if the trace is started from the track $f_2$, the trace is terminated in the track $f_3$ after eight tracks. In the head trace locus $X_{H2}$, the trace is started from the track $f_4$ which is located after one track from the track $f_3$ and is terminated in the track $f_4$ after eight tracks. In the next head trace locus $X_{H3}$, trace is started from the track $f_1$ which is located after one track from the track $f_4$ and is terminated in the track $f_1$ after eight tracks. Moreover, in the next head trace locus $X_{H4}$ trace is started from the track $f_2$ immediately after the track $f_1$ and is terminated in the track $f_2$ after eight tracks.

In such a case, the intrinsic output pattern of the reproduced pilot signal is repeated by the trace of four times (in unit of four fields) indicated by the head trace loci $X_{H1} \rightarrow X_{H2} \rightarrow X_{H3} \rightarrow X_{H4}$.

Figure 21:
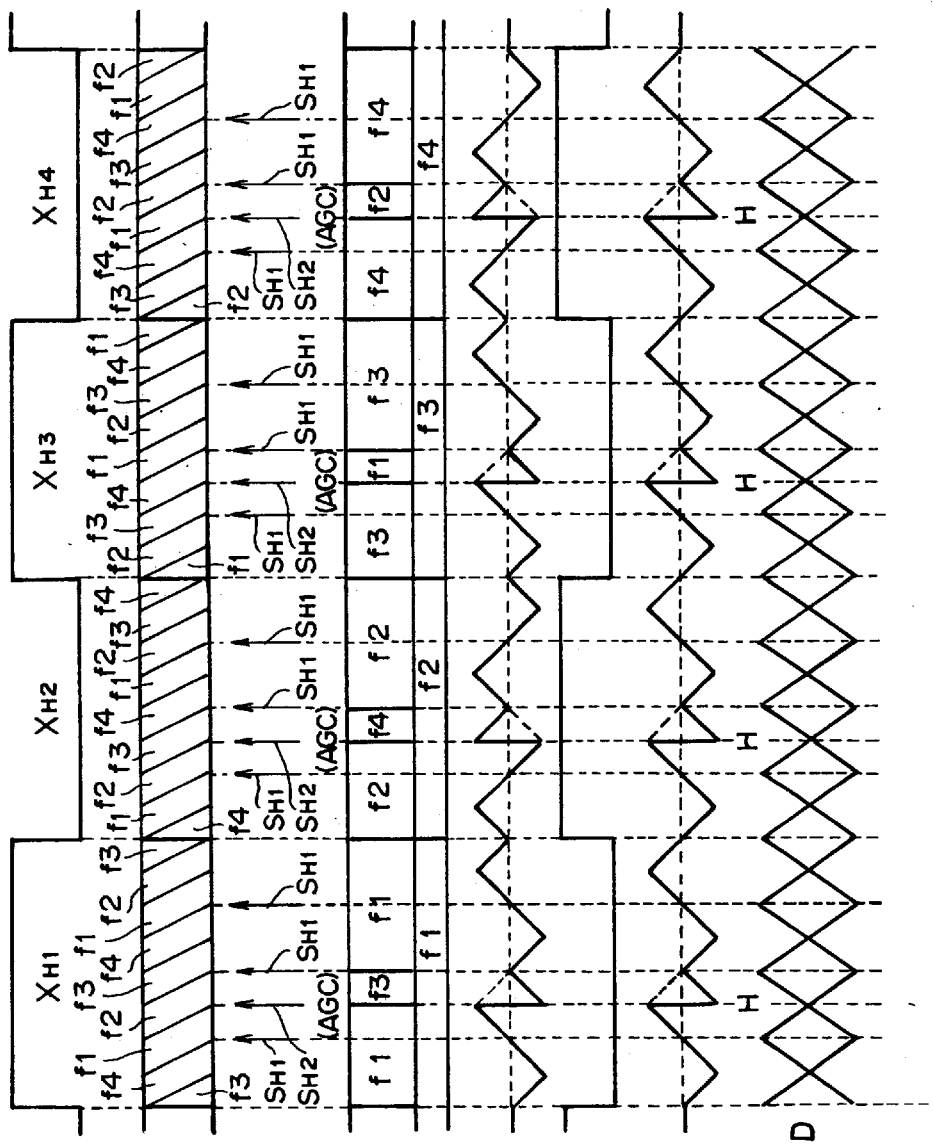
FIGS. 21A to 21I show a timing chart indicating operations of the essential portions obtained on the basis of the tracing condition of FIG. 20.

FIG. 21 is a timing chart indicating operations of the essential portions corresponding to the trace operation shown in FIG. 20. The same portions as those in the timing charts explained previously are designated by the same codes and the same explanation is not repeated here.

Since the trace is performed as shown in FIG. 20, the reproduced pilot signal $S_{PL}$ has the waveform shown in FIG. 21B and the reproduced RF signal has the waveform, for example, including amplitude change of envelope as shown in FIG. 21I, depending on the azimuth of tracks traced.

In this case, as shown in FIG. 21E, the standard pilot signal $S_{STD}$ is set, for the reproduced pilot signal $S_{PL}$ shown in FIG. 21B, under the condition that the frequencies $f_1$, $f_2$, $f_3$, $f_4$ are sequentially rotated in every field period.

The REF pilot signal $S_{REF}$ generated on the basis of the standard pilot signal $S_{STD}$ has the waveform shown in FIG. 21D. In such a case, the REF pilot signal $S_{REF}$ is switched to $f_1 \rightarrow f_3 \rightarrow f_1$ in the predetermined timing in the field period, for example, where the standard pilot signal $S_{STD}$ of the frequency $f_1$ is set depending on the rotation of the standard pilot signal $S_{STD}$. Moreover, in the field period where the standard pilot signal $S_{STD}$ of the frequency $f_2$ is set, the REF pilot signal $S_{REF}$ is switched to $f_2 \rightarrow f_4 \rightarrow f_2$ in the predetermined timing. In the field period where the standard pilot signal $S_{STD}$ of the frequency $f_3$ is set, the REF pilot signal $S_{REF}$ is switched to $f_3 \rightarrow f_1 \rightarrow f_3$. In the field period where the standard pilot signal $S_{STD}$ of the frequency $f_3$ is set, the REF pilot signal $S_{REF}$ is switched to $f_4 \rightarrow f_2 \rightarrow f_4$.

Figure 22:
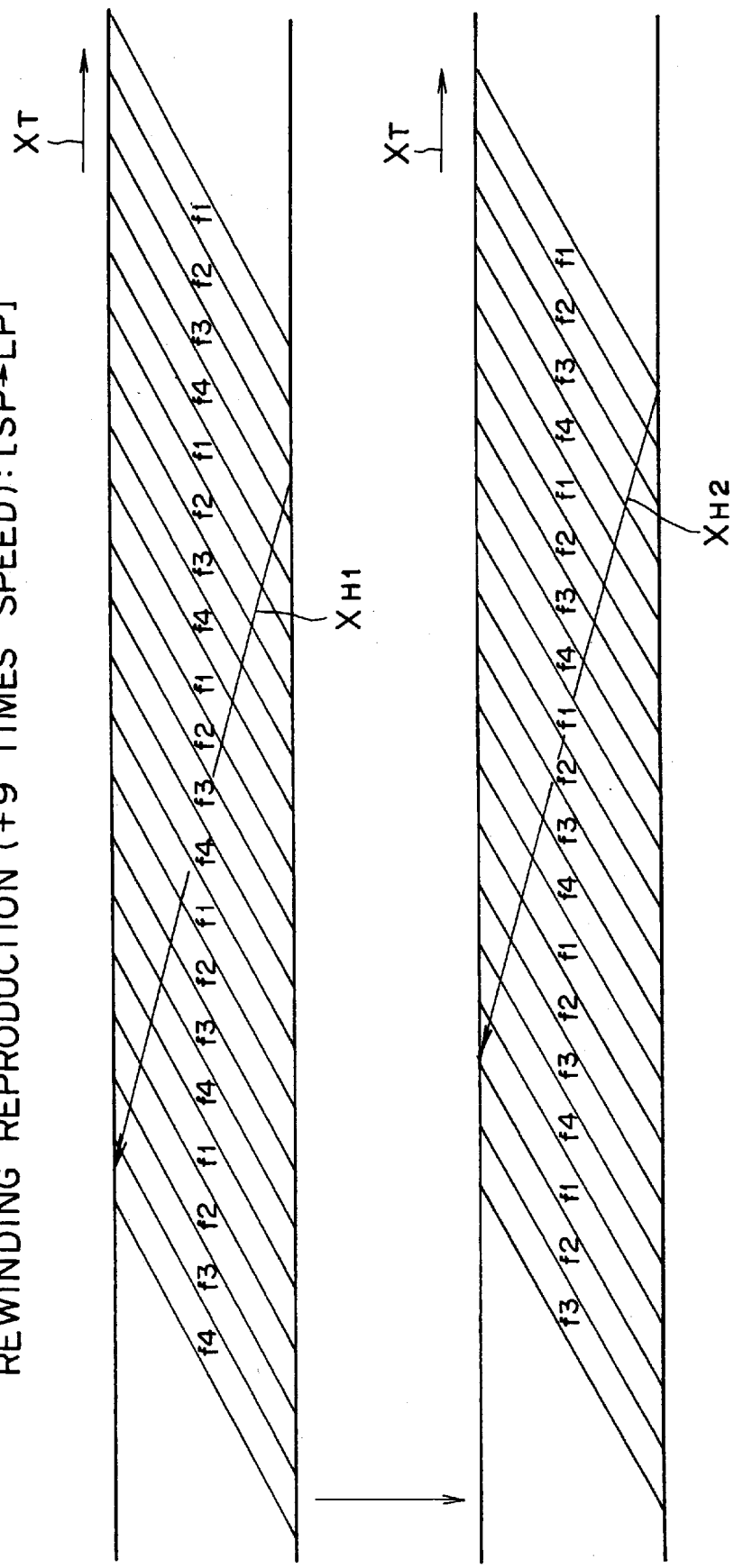
FIG. 22 is a diagram showing the tracing condition of a head for the track recorded on a magnetic tape.

FIG. 22 shows the trace condition of magnetic tape T by the head when the magnetic tape recording mode is changed to the LP mode from the SP mode while the fast feeding reproduction is performed at the +9 times speed as the multiplied speed corresponding to the SP mode. In this case, the magnetic tape T is running at the multiplied speed corresponding to the SP mode and is traced by the SP mode head, while the track of the magnetic tape T is LP mode.

In such a case, as indicated by the head trace loci $X_{H1}$, $X_{H2}$, the SP mode head traces 18 tracks of the LP mode track in every field period. In this case, moreover, in the first head trace locus $X_{H1}$, if trace is started from the track $f_3$, this trace operation is terminated in the track $f_4$ after 17 tracks. In the head trace locus $X_{H2}$, trace is started from the track $f_1$ immediately after the track $f_4$ and is terminated in the track $f_2$ after 17 tracks.

In this case, the intrinsic output pattern of the reproduced pilot signal $S_{PL}$ can be obtained repeatedly by the trace of two times (in unit of two fields) indicated by the head trace loci $X_{H1} \rightarrow X_{H2}$.

FIG. 23 is a timing chart indicating operations of the corresponding essential portions when the magnetic tape is traced as shown in FIG. 22. The same portions as those in the timing charts explained previously are designated by the same codes and the same explanation is not repeated here.

In this case, the reproduced RF signal can be obtained without any amplitude change of envelope as shown in FIG. 23I with the same reason explained in regard to FIG. 11I.

Moreover, the reproduced pilot signal $S_{PL}$ has the waveform shown in FIG. 23B.

Since the REF pilot signal $S_{REF}$ (FIG. 23D) on the basis of the standard pilot signal $S_{STD}$ (FIG. 23E) which is set to be rotated in the frequencies $f_1$ to $f_4$ is output for the reproduced pilot signal $S_{PL}$, the arithmetic output signal $S_{SUB}$ and the tracking error signal $S_{ERR}$ output from the switch circuit 9 have the waveforms respectively shown in FIG. 23F and FIG. 23H.

The recording mode discriminating signal $S_D$ obtains the time series pattern in which (XHXL . . . ) is repeated by sampling the tracking error signal $S_{ERR}$ once in every field in the timing of the sample hold control signal $S_{H2}$ shown in FIG. 23C. This pattern well matches the time series pattern (HXLXHXLX . . . ) explained in regard to FIG. 7. In this case, the recording mode discriminating signal $S_D$ may be started by any signal of the H level, L level or X (not inquired).

FIG. 24 shows the trace condition of the magnetic tape T by the head when the magnetic tape recording mode is changed to the SP mode from the LP mode while the fast feeding reproduction is performed at the +9 times speed as the multiplied speed mode corresponding to the LP mode. In this case, the magnetic tape T is running in the multiplied speed mode corresponding to the LP mode and is traced by the LP mode head, while the track of the magnetic tape is SP mode.

In this case, as indicated by the head trace loci $X_{H1}$ to $X_{H5}$, the LP mode head 4.5 (=9/2) tracks of the SP mode track in every field period. In this case, in the head race locus $X_{H1}$ if trace is started from the position of track $f_3$, this trace is terminated in the track $f_3$ after four tracks. In the subsequent head trace locus $X_{H2}$, trace is started from the track $f_3$ which is finally traced in the head trace locus $X_{H1}$ and is terminated in the track $f_3$ after four tracks. In the head trace locus $X_{H3}$, trace is started from the track $f_4$ immediately after the track $f_3$ and is terminated in the track $f_4$ after four tracks. In the head trace locus $X_{H4}$, trace is started from the track $f_4$ which is finally traced in the head trace locus $X_{H3}$ and is terminated in the track $f_4$ after four tracks. In the head trace locus $X_{H5}$, trace is started from the track $f_1$ immediately after the track $f_4$ and is terminated in the track $f_1$ after four tracks.

Since the magnetic tape is traced as explained above, the intrinsic reproduction pattern of the reproduced pilot signal $S_{PL}$ can be obtained by the trace operation of eight times (in unit of eight field periods).

FIG. 25 shows a timing chart indicating operations of the corresponding essential portions when the magnetic tape is traced as shown in FIG. 24. The same portions as those explained in the timing charts explained above are designated by the same codes and the same explanation is not repeated here.

In this case, since the LP mode head traces the tracks (track pitch is almost two times that of the LP mode) of the SP mode, the reproduced RF signal obtains the amplitude change of envelope corresponding to the tracks of the same azimuth as shown in FIG. 25I. In this case, since the track is traced in the manner explained in regard to FIG. 24, the reproduced pilot signal $S_{PL}$ has the waveform shown in FIG. 25B.

Since the REF pilot signal $S_{REF}$ (FIG. 25D) based on the standard pilot signal $S_{STD}$ (FIG. 25E) which is set to be rotated in the frequencies $f_1$ to $f_4$ is supplied to the multiplier 1 for the reproduced pilot signal $S_{PL}$, the arithmetic output signal $S_{SUB}$ of the subtractor 7 and the tracking error signal $S_{ERR}$ output from the switch circuit 9 have the waveforms respectively shown in FIG. 25F and FIG. 2H.

The recording mode discriminating signal $S_D$ obtains the time series pattern (LLXXHHXXLLXXHH . . . ) by sampling the tracking error signal $S_{ERR}$ once in every field in the timing of the sample hold control signal $S_{H2}$ shown in FIG. 25C. This pattern matches the time series pattern (HHXXLLXXHHXXLL . . . ) explained in regard to FIG. 7. In this case, the mode discriminating signal $S_D$ may be started by any signal of the H level, L level or X (not inquired).

Regarding to the appearing manner of the time series pattern of the recording mode discriminating signal $S_D$ for the rewinding reproducing operation under the condition that the liquid crystal display mode is OFF, it is not explained because the appearing manner of the time series pattern of the recording mode discriminating signal $S_D$ explained in FIG. 7 may be derived easily by considering the explanation about the operation of the rewinding reproduction mode when the liquid crystal display mode is On and the explanation bout the operation of the fast feeding reproduction mode when the liquid crystal display mode is OFF.

Moreover, the embodiment has been explained under the condition that the recording mode discriminating apparatus of the present invention is applied to a portable type 8 mm VTR(camcorder) provided with a liquid crystal display apparatus. But the present invention is not limited thereto and it is also possible to provide a VTR other than the 8 mm VTR. In addition, the present invention can also be applied to a stationary type VTR provided with a liquid crystal display apparatus.

As explained above, the present invention provides the effect that the recording mode discrimination may be realized even when the fast feeding/rewinding reproduction is performed in any of the odd number times speed or even number times speed with the structure for common recording mode discrimination by executing the switching operation that the standard pilot signal for generating the tracking error signal is set in the fixed frequency when the fast feeding/rewinding reproduction is performed at the even number times speed of the ordinary reproduction speed and the standard pilot signal is set to be rotated in the frequencies when the fast feeding/rewinding reproduction is performed at the odd number times speed to make reference to the time series pattern of the output obtained by sampling the tracking error signal in the predetermined timing.

What is claimed is:

1. A recording mode discrimination apparatus, comprising:

drive means for driving a recording medium like a magnetic tape in different running speeds corresponding to a plurality of modes;

reproducing means for reproducing a plurality of different kinds of pilot signals, each kind of pilot signal being of a frequency unique to that kind of pilot signal and being used for generating a tracking error signal for use in performing tracking control when accessing said recording medium; and discrimination means for discriminating a recording mode based on the pattern of an output signal which is obtained when the drive means drives the recording medium in a first high speed reproducing mode, said first high speed reproducing mode being employed when a display mode of a liquid crystal display apparatus which can display an image reproduced from said recording medium is ON and corresponding to a fast feeding reproducing operation and a rewinding reproducing operation in which the reproduction speed is, respectively, an even number times the speed of the ordinary reproduction speed and a negative even number of times the speed of the ordinary reproduction speed, the discriminating of said recording mode being realized by outputting a predetermined one of said kinds of pilot signal during said first high speed reproducing mode for comparison with pilot signals reproduced from said recording medium, and for discriminating the recording mode based on the pattern of an output signal which is obtained when the drive means drives the recording medium in a second high speed reproducing mode, said second high speed reproducing mode being employed when the display mode of the liquid crystal display apparatus which can display an image reproduced from said recording medium is OFF and corresponding to a fast feeding reproducing operation and a rewinding reproducing operation in which the reproduction speed is, respectively, an odd number times the speed of the ordinary reproduction speed and a negative odd number of times the speed of the ordinary reproduction speed, the discriminating of said recording mode being realized by outputting said kinds of pilot signals in a rotating fashion according to a predetermined timing during said second high speed reproducing mode and comparing the outputted kinds of pilot signals with pilot signals reproduced from said recording medium.

2. A recording mode discrimination apparatus according to claim 1, wherein said recording medium is driven at 6 times the ordinary reproduction speed in the first high speed reproducing mode.

3. A recording mode discrimination apparatus according to claim 1, wherein said liquid crystal display apparatus is integrated within a camera body.

4. A recording mode discriminating method, comprising the steps of:

driving a recording medium like a magnetic tape in different running speeds corresponding to a plurality of modes;

reproducing a plurality of different kinds of pilot signals, each kind of pilot signal being of a frequency unique to that kind of pilot signal and being used for generating a tracking error signal for use in performing tracking control when accessing said recording medium; and discriminating a recording mode based on the pattern of an output signal which is obtained when the drive means drives the recording medium in a first high speed reproducing mode, said first high speed reproducing mode being employed when a display mode of a liquid crystal display apparatus which can display an image reproduced from said recording medium is ON and corresponding to a fast feeding reproducing operation and a rewinding reproducing operation in which the reproduction speed is, respectively, an even number times the speed of the ordinary reproduction speed and a negative even number of times the speed of the ordinary reproduction speed, the discriminating of said recording mode being realized by outputting a predetermined one of said kinds of pilot signal during said first high speed reproducing mode for comparison with pilot signals reproduced from said recording medium; and discriminating the recording mode based on the pattern of an output signal which is obtained when the drive means drives the recording medium in a second high speed reproducing mode, said second high speed reproducing mode being employed when the display mode of the liquid crystal display apparatus which can display an image reproduced from said recording medium is OFF and corresponding to a fast feeding reproducing operation and a rewinding reproducing operation in which the reproduction speed is, respectively, an odd number times the speed of the ordinary reproduction speed and a negative odd number of times the speed of the ordinary reproduction speed, the discriminating of said recording mode being realized by outputting said kinds of pilot signals in a rotating fashion according to a predetermined timing during said second high speed reproducing mode and comparing the outputted kinds of pilot signals with pilot signals reproduced from said recording medium.

* * * * *